US011197196B2

(12) United States Patent
Kerpez et al.

(10) Patent No.: US 11,197,196 B2
(45) Date of Patent: *Dec. 7, 2021

(54) OPTIMIZED CONTROL SYSTEM FOR AGGREGATION OF MULTIPLE BROADBAND CONNECTIONS OVER RADIO INTERFACES

(71) Applicant: ASSIA SPE, LLC, Wilmington, DE (US)

(72) Inventors: Kenneth J. Kerpez, Long Valley, NJ (US); Mung Chiang, Princeton, NJ (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,097

(22) Filed: Aug. 27, 2018

(65) Prior Publication Data

US 2019/0159068 A1    May 23, 2019

Related U.S. Application Data

(63) Continuation of application No. 14/431,774, filed as application No. PCT/US2014/068666 on Dec. 4, 2014, now Pat. No. 10,064,095.

(51) Int. Cl.
*H04W 28/08* (2009.01)
*H04L 12/24* (2006.01)
(Continued)

(52) U.S. Cl.
CPC ......... *H04W 28/08* (2013.01); *H04L 12/2869* (2013.01); *H04L 12/66* (2013.01);
(Continued)

(58) Field of Classification Search
CPC .................................................. H04W 28/08
See application file for complete search history.

(56) References Cited

U.S. PATENT DOCUMENTS 5,970,064 A    10/1999  Clark et al.
5,974,106 A    10/1999  Dupont et al.
(Continued)

FOREIGN PATENT DOCUMENTS

CN     1561039 A1    1/2005
CN   101658059 A1    4/2007
(Continued)

OTHER PUBLICATIONS

Office Action dated Apr. 16, 2019, in Canadian Patent Application No. 2886147 (4pgs).
(Continued)

*Primary Examiner* — Jason E Mattis
(74) *Attorney, Agent, or Firm* — North Weber & Baugh LLP; Michael V. North

(57) ABSTRACT

In accordance with embodiments disclosed herein, there are provided apparatus, systems and methods for implementing and using optimized control systems for aggregation of multiple broadband connections over radio interfaces. For example, such a system may include: a processor and a memory to perform instructions embodied by the system; a plurality of antennas; a traffic coordinator to interface to two or more wireless communications nodes together, through the system, in which each of the wireless communications nodes have access to a wide Area Network (WAN) backhaul connection independent of the system; a first wireless communications interface to a first wireless communication node established via a first of the plurality of antennas, the first wireless communications node having access to a first WAN backhaul connection; a second wireless communications interface to a second wireless communications node estab-
(Continued)

lished via a second of the plurality of antennas, the second wireless communications node having access to a second WAN backhaul connection distinct from the first WAN backhaul connection; and a control module to receive information on traffic flows through the system and a radio environment within which the system operates, in which the control module to: issue commands to control the formation and continuation of connections of the first and second wireless communications interfaces to WAN connections and WAN backhaul connections, and to further provide scheduling and routing instructions for the WAN connections and WAN backhaul connections. Other related embodiments are disclosed.

20 Claims, 9 Drawing Sheets

(51) Int. Cl.
  *H04L 12/26*   (2006.01)
  *H04L 12/28*   (2006.01)
  *H04W 76/10*   (2018.01)
  *H04L 12/66*   (2006.01)
  *H04W 72/04*   (2009.01)
  *H04W 72/12*   (2009.01)
  *H04W 88/08*   (2009.01)

(52) U.S. Cl.
  CPC ...... *H04L 41/0213* (2013.01); *H04L 41/0823* (2013.01); *H04L 41/14* (2013.01); *H04L 41/142* (2013.01); *H04L 41/147* (2013.01); *H04L 43/0882* (2013.01); *H04W 72/0406* (2013.01); *H04W 72/1252* (2013.01); *H04W 76/10* (2018.02); *H04W 88/08* (2013.01)

(56) References Cited

U.S. PATENT DOCUMENTS

| | | |
|---|---|---|
| 6,430,612 B1 | 8/2002 | Iizuka |
| 6,469,982 B1 | 10/2002 | Henrion et al. |
| 6,542,500 B1 | 4/2003 | Gerszberg et al. |
| 6,618,356 B1 | 9/2003 | Bonaventure |
| 6,678,247 B1 | 1/2004 | Bonaventure |
| 6,680,907 B1 | 1/2004 | Bonaventure |
| 7,840,220 B1 | 11/2010 | Mitchell |
| 7,864,669 B2 | 1/2011 | Bonaventure et al. |
| 8,126,011 B2 | 2/2012 | Evans |
| 8,249,520 B2 | 8/2012 | Chuang et al. |
| 8,355,316 B1 | 1/2013 | Lushear et al. |
| 8,472,334 B2 | 6/2013 | Likar et al. |
| 8,483,059 B2 | 7/2013 | Likar et al. |
| 8,520,586 B1 | 8/2013 | Husted et al. |
| 8,565,106 B2 | 10/2013 | Likar et al. |
| 8,699,341 B2 | 4/2014 | Likar et al. |
| 8,867,490 B1 | 10/2014 | Krishna et al. |
| 8,880,666 B2 | 11/2014 | Aaron et al. |
| 8,885,511 B2 | 11/2014 | Likar et al. |
| 9,277,564 B2 | 3/2016 | Wang et al. |
| 9,313,752 B2 | 4/2016 | Czaja et al. |
| 9,510,256 B2 | 11/2016 | Krishna et al. |
| 9,819,595 B2 | 11/2017 | Cioffi et al. |
| 10,064,095 B2 * | 8/2018 | Kerpez ............ H04W 72/0406 |
| 10,530,695 B2 | 1/2020 | Cioffi et al. |
| 2003/0031180 A1 | 2/2003 | Datta et al. |
| 2003/0076784 A1 | 4/2003 | Ta et al. |
| 2003/0198200 A1 | 10/2003 | Diener et al. |
| 2004/0221296 A1 | 11/2004 | Ogielski et al. |
| 2005/0055466 A1 | 3/2005 | Mitsuru |
| 2005/0055579 A1 | 3/2005 | Kanda et al. |
| 2005/0114501 A1 | 5/2005 | Raden et al. |
| 2005/0132044 A1 | 6/2005 | Guingo et al. |
| 2005/0182848 A1 | 8/2005 | McNeil et al. |
| 2006/0126613 A1 | 6/2006 | Zweig |
| 2006/0187885 A1 | 8/2006 | Roy et al. |
| 2007/0028168 A1 | 2/2007 | Robbins et al. |
| 2007/0060078 A1 | 3/2007 | Lockie et al. |
| 2007/0153807 A1 | 7/2007 | Cruz et al. |
| 2007/0180490 A1 | 8/2007 | Renzi et al. |
| 2008/0098454 A1 | 4/2008 | Toh |
| 2008/0159124 A1 | 7/2008 | Sasaki |
| 2008/0186873 A1 | 8/2008 | Pujet et al. |
| 2008/0209070 A1 | 8/2008 | Horn |
| 2008/0219239 A1 | 9/2008 | Bell et al. |
| 2008/0320108 A1 | 12/2008 | Murty |
| 2009/0016358 A1 | 1/2009 | Lee |
| 2009/0055900 A1 | 2/2009 | Gopalasetty et al. |
| 2009/0075648 A1 | 3/2009 | Reed et al. |
| 2009/0147697 A1 | 6/2009 | Malik et al. |
| 2009/0201805 A1 | 8/2009 | Begen et al. |
| 2009/0207730 A1 | 8/2009 | Stamoulis et al. |
| 2009/0268668 A1 | 10/2009 | Tinnakomsrisuphap et al. |
| 2009/0280819 A1 | 11/2009 | Brisebois et al. |
| 2009/0310528 A1 | 12/2009 | Tamura |
| 2010/0064095 A1 | 3/2010 | Chen et al. |
| 2010/0153377 A1 | 6/2010 | Rajan et al. |
| 2010/0290465 A1 | 11/2010 | Ankaiah et al. |
| 2011/0002371 A1 | 1/2011 | Forenza et al. |
| 2011/0013529 A1 | 1/2011 | Bin et al. |
| 2011/0110359 A1 | 5/2011 | Cooke et al. |
| 2011/0116450 A1 | 5/2011 | Hirano et al. |
| 2011/0182182 A1 | 7/2011 | Yang et al. |
| 2011/0267951 A1 | 11/2011 | Stanwood et al. |
| 2011/0273979 A1 | 11/2011 | Grabelsky et al. |
| 2011/0314145 A1 | 12/2011 | Raleigh et al. |
| 2012/0008535 A1 | 1/2012 | Kuehnel |
| 2012/0089664 A1 | 4/2012 | Igelka |
| 2012/0151540 A1 | 6/2012 | Stanwood et al. |
| 2012/0294310 A1 | 11/2012 | Yen et al. |
| 2013/0077482 A1 | 3/2013 | Krishna et al. |
| 2013/0122910 A1 | 5/2013 | Singh et al. |
| 2013/0265985 A1 | 10/2013 | Salkintzis |
| 2013/0297810 A1 | 11/2013 | Ho et al. |
| 2013/0331114 A1 | 12/2013 | Gormley et al. |
| 2013/0336199 A1 | 12/2013 | Schwartz et al. |
| 2013/0343189 A1 | 12/2013 | Likar et al. |
| 2013/0343212 A1 | 12/2013 | Sedlar et al. |
| 2014/0321298 A1 | 10/2014 | Chow et al. |
| 2015/0016260 A1 | 1/2015 | Chow et al. |
| 2016/0261490 A1 | 9/2016 | Evans |
| 2016/0315976 A1 | 10/2016 | Detal et al. |
| 2018/0248984 A1 | 8/2018 | Bonaventure et al. |

FOREIGN PATENT DOCUMENTS

| | | |
|---|---|---|
| CN | 1994010 A | 7/2007 |
| CN | 101480078 A | 7/2009 |
| CN | 102369767 A | 3/2010 |
| CN | 102656863 A | 12/2010 |
| CN | 102696204 A | 1/2011 |
| CN | 101983535 A | 3/2011 |
| CN | 102098135 A | 3/2011 |
| EP | 1134932 A1 | 9/2001 |
| EP | 1819093 A1 | 9/2004 |
| EP | 2112781 A1 | 10/2009 |
| EP | 2426983 A1 | 7/2012 |
| EP | 1652363 B1 | 8/2012 |
| JP | 1996274835 A | 10/1996 |
| JP | 2000013435 A | 1/2000 |
| JP | 201168913 A | 6/2001 |
| JP | 200129070 A | 10/2001 |
| JP | 2002064561 A | 2/2002 |
| JP | 2002111729 A | 4/2002 |
| JP | 2002536914 A | 10/2002 |
| JP | 2003110605 A | 4/2003 |
| JP | 2003169056 A | 6/2003 |
| JP | 2004120609 A | 4/2004 |
| JP | 2004173170 A | 6/2004 |
| JP | 2004236030 A | 8/2004 |
| JP | 2004350198 A | 12/2004 |
| JP | 2005085238 A | 3/2005 |
| JP | 2005086628 A | 3/2005 |

(56) References Cited

FOREIGN PATENT DOCUMENTS

| JP | 2005136742 A | 5/2005 |
|---|---|---|
| JP | 2005142735 A | 6/2005 |
| JP | 2005309617 A | 11/2005 |
| JP | 2010056898 A | 3/2010 |
| JP | 2010537571 A | 12/2010 |
| JP | 2011525310 A | 9/2011 |
| JP | 2012532522 A | 12/2012 |
| JP | 2013516848 A | 5/2013 |
| JP | 2014504116 A | 2/2014 |
| WO | WO 2004075480 A1 | 9/2004 |
| WO | WO 2006091391 A2 | 8/2006 |
| WO | WO 20070116411 A1 | 10/2007 |
| WO | 2007136618 A2 | 11/2007 |
| WO | WO 2007136337 A2 | 11/2007 |
| WO | WO 2008072606 A | 3/2010 |
| WO | WO 20110079612 A1 | 7/2011 |
| WO | 2012070045 A2 | 5/2012 |
| WO | 2012132416 A1 | 10/2012 |
| WO | 2013085485 A1 | 6/2013 |
| WO | 2014051630 A1 | 4/2014 |

OTHER PUBLICATIONS

International Search Report and Written Opinion dated Jan. 25, 2013, in International PCT Patent Application No. PCT/US2012/058157 (13pgs).
International Preliminary Report on Patentability dated Apr. 9, 2015, in International PCT Patent Application No. PCT/US2012/058157 (9pgs).
Examination Report dated Jun. 7, 2016, in Canadian Patent Application No. 2,886,147 (6pgs).
Response filed Dec. 6, 2017, in Canadian Patent Application No. 2,886,147 (14pgs).
Examination Report dated May 18, 2018, in Canadian Patent Application No. 2,886,147 (4pgs).
Office Action dated Feb. 20, 2017, in Chinese Patent Application No. 2012800766679 (10pgs).
Response, and English translation of claims, filed Jul. 7, 2017, in Chinese Patent Application No. 2012800766679 (22pgs).
Office Action dated Nov. 13, 2017, in Chinese Patent Application No. 2012800766679 (3pgs).
Response, and English translation of claims, filed Nov. 23, 2017, in Chinese Patent Application No. 2012800766679 (15pgs).
Office Action dated Mar. 7, 2018, in Chinese Patent Application No. 2012800766679 (7pgs).
Response, and English translation of claims, filed May 9, 2018, in Chinese Patent Application No. 2012800766679 (38pgs).
Notice of Decision to Grant dated Sep. 13, 2018, in Chinese Patent Application No. 2012800766679 (4pgs).
Notice of Allowance dated Feb. 21, 2020 in related Canadian Application No. 2,886,147 1 pg.
Chinese Office Action dated Dec. 3, 2020 in the related Chinese Patent Application No. 201811414162.4, (13 pgs).
IETF 79 Proceedings, "Multipath TCP (pmtcp) (WG)," URL: https://www.ietf.org/proceedings/79/mptcp.html (3pgs).
Bagnulo, Marcelo, "MPTCP threats," MPTCP WG—IETF79, URL: https://www.ieft.org/proceedings/79/slides/mptcp-7/mptcp-7.htm (3pgs).
Yoshifumi, Nishida et al., "MPTCP—MULTIPATH TCP," WG meeting #5, Nov. 8, 2010 and Nov. 10, 2010, Beijing, ietf-79, URL: https://www.ietf.org/proceedings/79/slides/mptcp-3/mptcp-3.htm (7 pgs).
Ford, Alan, "MPTCP Protocol, draft-ietf-mptcp-multiaddressed-02, Update and Open Issues," IETF79—Beijing, URL: https://www.ietf.org/proceedings/79/slides/mptcp-2/mpctp2.htm (11 pgs).
Ford, Alan, "MPTCP API, draft-scharf-mptcp-api-03," IETF79—Beijing, URL: https://www.ietf.org/proceedings/79/slides/mptcp-1/mptcp-1.htm (6pgs).
Ford, Alan, "MPTCP Architecture, draft-ietf-mptcp-architecture-02," IETF79—Beijing, URL: https://www.ietf.org/proceedings/79/slides/mptcp-0/mptcp-0.htm (7pgs).

Raiciu, Costin et al., "Data Center Networking with Multipath TCP," URL: https://www.ietf.org/proceedings/79/slides/mptcp-6/mptcp-6.htm (28pgs).
Honda, Michio et al., "Midterm Reports of MPTCP-Related Middlebox Behavior," MPTCP WG, Nov. 10, 2010, 79th IETF@Beijing, URL: https://www.ietf.org/proceedings/79/slides/mptcp-5/mptcp-5.htm (13pgs).
Nishida, Yoshifumi et al., "MPTCP—MULTIPATH TCP," WG meeting #5, Nov. 8, 2010 and Nov. 10, 2010, Beijing, ietf-79, URL: https://www.ietf.org/proceedings/79/slides/mptcp-4/mptcp-4.htm (5pgs). 78th IETF Meeting in Maastricht, Netherlands, Mar. 25, 2010, URL: https://www.ietf.org/proceedings/78/mptcp.htm (4pgs).
Eardley, Philip et al., "MPTCP—MULTIPATH TCP," WG meeting #3, Jul. 27, 2010 and Jul. 29, 2010, Maastricht, ietf-78, URL: https://www.ietf.org/proceedings/78/slides/mptcp-0/mptcp-0.htm (8pgs).
Honda, Michio et al., Middlebox Investigation in The Internet for Designing TCP Extensions, Jul. 27, 2010, 78th IETF @ Maastricht, Netherlands, URL: https://www.ietf.org/proceedings/78/slides/mptcp-1.pdf (13pgs).
Scharf. Michael, Options vs. Payload Encoding: MCTCP's Perspective, draft-schaft-mptcp-mctcp-01, IETF78, Jul. 2010, URL: https://www.ietf.org/proceedings/78/slides/mptcp-2.pdf (9pgs).
Raiciu, Costin, IETF78, Maastricht, URL: https://www.ietf.org/proceedings/78/slides/mptcp-3/mptcp-3.htm (14pgs).
Eardley, Philip et al., "MPTCP—MULTIPATH TCP," WG meeting #3, Jul. 27, 2010 and Jul. 29, 2010, Maastricht, ietf-78, URL: https://www.ietf.org/proceedings/78/slides/mptcp-9/mptcp-9.htm (15pgs).
"MPTCP threats," MPTCP WG IETF78—Maastricht, URL: https://www.ietf.org/proceedings/78/slides/mptcp-10.pdf (5pgs).
Ford, Alan, "MPTCP Architecture—Status Update, draft-ietf-mptcp-architecture-01", IETF78—Maastricht, URL: https://www.ieft.org/proceedings/78/slides/mptcp-6/mptcp-6.htm (3pgs).
Ford, Alan, "MPTCP Protocol—Status Update, draft-ieft-mptcp-multiaddressed-01," IETF78—Maastricht, URL: https://www.ieft.org/proceedings/78/slides/mptcp-5/mptcp-5.htm (6pgs).
Raiciu, Costin, "Update on Multipath Congestion Control," IETF78, Maastricht, URL: https://www.ietf.org/proceedings/78/slides/mptcp-8.mptcp-8.htm (3pgs).
Scharf, Michael et al., "MPTCP Application Considerations, draft-scharf-mptcp-api-02," IETF78, Jul. 2010, URL: https://www.ietf.org/proceedings/78/slides/mptcp-7.pdf (8pgs).
Nishida, Yoshifumi et al., Charter from 77th IETF Meeting in Anaheim, CA, Mar. 25, 2010, "2.8.6 Multipath TCP (mptcp)," URL: https://www.ietf.org/proceedings/77/mptcp.html (4pgs).
Ford, Alan, "Multipath TCP Architecture (draft-ietf-mptcp-architecture-00)," URL: https://www.ietf.org/proceedings/77/slides/mptcp-0/mptcp-0_files/v3_document.htm (7pgs).
Ford, Alan, "Multipath TCP draft-ford-mptcp-multiaddressed-03," URL://www.ietf.org/proceedings/77/slides/mptcp-1/mptcp-1_files/v3_document.htm (6pgs).
Raiciu, Costin, "Multipath TCP Signaling Options or Payload?" URL: https://www.ietf.org/proceedings/77/slides/mptcp-4.pdf (19pgs).
Bagnulo, Marcelo, "MPTCP threat analysis: an update," IETF77—MPTCP WG, URL: https://www.ietf.org/proceedings/77/slides/mptcp-10/mptcp-10_files/v3_document.htm (23pgs).
Handley, Mark et al., "Coupled Congestion Control for MPTCP," URL: https://www.ietf.org/proceedings/77/slides/mptcp-9.pdf (16pgs).
Scharf, Michael et al., "MPTCP Application Considerations, draft-scharft-mptcp-api-01," Mar. 2010, URL: https://www.ietf.org/proceedings/77/slides/mptcp-8_files/v3_document.htm (13pgs).
"SICS, Name based sockets, apropos MPTCP API," Mar. 26, 2010 part of Swedish ICT, Mar. 26, 2010, IETF77, Anaheim, URL://www.ietf.org/proceedings/77/slides/mptcp-7.pdf (24pgs).
Nishida, Yoshifumi et al., Charter from 76th IETF Meeting in Hiroshima, Japan, Oct. 29, 2009, "2.8.8 Multipath TCP (mptcp)," URL: https://www.ietf.org/proceedings/76/mptcp.html (4pgs).
"MPTCP—MULTIPATH TCP," WG meeting #1, Nov. 9, 2009, Hiroshima, Japan, ietf-76, URL: https://www.ietf.org/proceedings/76/slides/mptcp-7-/mptcp-7.htm (11pgs).
"An Architectural Perspective on Multipath Transport, draft-ford-mptcp-architecture-00," URL: https://www.ietf.org/proceedings/76/slides/mptcp-5.pdf (15pgs).

(56) References Cited

OTHER PUBLICATIONS

Ford, Alan et al., "Multi-addressed Multipath TCP, draft-ford-mptcp-multiaddressed-02," URL: https://www.ietf.org/proceedings/76/slides.mptcp-3.mptcp-3.htm (22pgs).
Raiciu, Costin et al., "Linked Congestion Control," URL: https://www.ietf.org/proceedings/76/slides/mptcp-8.pdf (32pgs).
Bagnulo, Marcelo, "MPTCP Threat analysis, draft-bagnulo-mptcp-threat-00," IETF76—MPTCP WG, URL: https://www.ietf.org/proceedings/76/slides/mptcp-0/mptcp-0.htm (28pgs).
Scharf, Michael et al., "MPTCP Application Considerations, draft-scharf-mptcp-api-00.txt," Nov. 9, 2009, URL: https://www.ietf.org/proceedings/76/slides/mptcp-2/mptcp-2.htm (10pgs).
Handley, Mark, et al., "Routing of Outgoing Packets with MP-TCP, draft-handley-mptcp-routing-00," URL: https://www.ietf.org/proceedings/76/slides/mptcp-4/mptcp-4.htm (21pgs).
Nishida, Yoshifumi et al., Charter from 75th IETF Meeting in Stockholm, Sweden, Oct. 19, 2009, "2.8.5 Multipath TCP (mptcp)," URL: https://www.ietf.org/proceedings/75th/mptcp.html (4pgs).
Handley, Mark, "Multipath TCP: Goals and Background," URL: https://www.ietf.org/proceedings/75/slides/mptcp-0.pdf (26pgs).
Ford, Alan, "Multipath TCP Protocol Design," URL: https://www.ietf.org/proceedings/75/slides.mptcp-2.pdf (16pgs).
Raiciu, Costin, "Linked Congestion Control," URL: https://www.ietf.org/proceedings/75/slides/mptcp-4.pdf (35pgs).
Iyengar, Janardhan et al., "An Architectural Perspective on MPTCP," Draft: http://tools.ietf.org/html/draft-iyengar-ford-tng-00, presentation for MPTCP BoF at IETF75, Jul. 30, 2009, URL: https://ietf.org/proceedings/75/slides/mptcp-5.pdf (13pgs).
Handley, Mark et al., "Multipath TCP BOF," IETF-75, Stockholm, Sweden, Jul. 30, 2009, URL: https://ietf.org/proceedings/75/slides/mptcp-3/mptcp-3_files/v3_document.htm (6pgs).
Naresh, Kumar et al., "Security for 5G, draft-naresh-mptcp-security-for-5g-01.txt," Aug. 4, 2018, URL: https://tools.ietf.org/html/draft-naresh-mptcp-security-for-5g-01 (7pgs).
Shailendra, Samar et al., "Extended Socket APIs to control subflow priority in Multipath TCP, draft-samar-mptcp-socketapi-01.txt," URL: https://tools.ietf.org/html/draft-samar-mptcp-socketapi-01 (7pgs).
De Foy, X. et al., "Considerations for MPTCP operation in 5G, draft-defoy-mptcp-considerations-for-5g-01," URL: https://tools.ietf.org/html/draft-defoy-mptcp-considerations-for-5g-01 (13pgs).
Song, F. et al., "One Way Latency Considerations for MPTCP, draft-song-mptcp-owl-04," URL: https://tools.ietf.org/html/draft-song-mptcp-owl-04 (11pgs).
Barre, S. et al., TFO support for Multipath TCP, draft-barre-mptcp-tfo-03, May 29, 2018, URL: https://tools.ietf.org/html/draft-barre-mptcp-tfo-03 (12pgs).
Ford, A. et al., "TCP Extensions for Multipath Operation with Multiple Addresses, draft-ietf-mptcp-rfc6824bis-11," May 15, 2018, URL: https://tools.ietf.org/html/draft-ietf-mptcp-rfc6824bis-11 (76pgs).
Zuo, J. et al., "A Path-Aware Scheduling Scheme for Multipath Transport Protocols, draft-zuo-mptcp-scheduler-01.txt," Mar. 21, 2018, URL: https://tools.ietf.org/html/draft-zuo-mptcp-scheduler-01 (8pgs).
Hesmans, B. et al., "A socket API to control Multipath TCP, draft-hesmans-mptcp-socket-03," Mar. 5, 2018, URL https://tools.ieft.org/html/draft-hesmans-mptcp-socket-03 (18pgs).
Deng, L. et al., "MPTCP Proxy for Mobile Networks, draft-deng-mptcp-mobile-network-proxy-00," Feb. 14, 2014, URL: https://tools.ietf.org/html/draft-deng-mptcp-mobile-network-proxy-00 (8pgs).
Bagnulo, M., "Secure MPTCP, draft-bagnulo-mptcp-secure-00," Feb. 12, 2014, URL: https://tools.ietf.org/html/draft-bagnulo-mptcp-secure-00 (8pgs).
Paasch, C. et al., "A generic control stream for Multipath TCP, draft-paasch-mptcp-control-stream-00," Feb. 11, 2014, URL: https://tools.ietf.org/html/draft-ppaasch-mptcp-control-stream-00 (11pgs).
Deng, Zhenjie, "Non-Renegable Selective Acknowledgements (NR-SACKs) for MPTCP, draft-deng-mptcp-nrsack-00.txt," Dec. 2, 2013, URL: https://tools.ietf.org/html/draft-deng-mptcp-nrsack-00 (10pgs).

Wing, D. et al., "Multipath TCP (MPTCP) Path Selection using PCP, draft-wing-mptcp-pcp-00," Oct. 7, 2013, URL: https://tools.ietf.org/html/draft-wing-mptcp-pcp-00 (10pgs).
Bagnulo, M. et al., "Analysis of MPTCP residual threats and possible fixes, draft-bagnulo-mptcp-attacks-01," Oct. 1, 2013, URL: https://tools.ietf.org/html/draft-bagnulo-mptcp-attacks-01 (25pgs).
Coene, Y. et al., "Conformance tests for Multipath TCP, draft-coene-mptcp-conformance-00," Jul. 15, 2013, URL: https://tools.ietf.org/html/draft-coene-mptcp-conformance-00 (10pgs).
Eardley, P., "Survey of MPTCP Implementations, draft-eardley-mptcp-implementations-survey-02," Jul. 12, 2013, URL: https://tools.ietf.org/html/draft-eardley-mptcp-implementations-survey-02 (38pgs).
Xue, K. et al., "TMPP for Both Two MPTCP-unware Hosts, draft-xue-mptcp-tmpp-unware-hosts-02," Jun. 20, 2013, URL: https://tools.ietf.org/html/draft-xue-mptcp-tmpp-unware-hosts-02 (15pgs).
Scharf, M. et al., "MPTCP Application Interface Considerations, draft-ietf-mptcp-api-07," Jan. 19, 2013, URL: https://tools.ietf.org/html/draft-ietf-mptcp-api-07 (34pgs).
Ford, A. et al., "TCP Extensions for Multipath Operation with Multiple Addresses, draft-ietf-mptcp-multiaddressed-12," Oct. 22, 2012, URL: https://tools.ietf.org/html/draft-ietf-mptcp-multiaddressed-12 (63pgs).
Paasch, C., Ed. et al., "Securing the MultiPath TCP handshake with external keys, draft-paasch-mptcp-ssl-00," Oct. 15, 2012, URL: https://tools.ietf.org/html/draft-paasch-mptcp-ssl-00 (8pgs).
Paasch, C., Ed. et al., "MultiPath TCP Low Overhead, draft-paasch-mptcp-lowoverhead-00," Oct. 15, 2012, URL: https://tools.ietf.org/html/draft-paasch-mptcp-lowoverhead-00 (9pgs).
Hampel, G. et al., "MPTCP Proxies and Anchors, draft-hampel-mptcp-proxies-anchors-00," Feb. 8, 2012, URL: https://tools.ietf.org/html/draft-hampel-mptcp-proxies-anchors-00 (30pgs).
Raiciu, C. et al., "Coupled Congestion Control for Multipath Transport Protocols, draft-ietf-mptcp-congestion-07," Jul. 29, 2011, URL: https://tools.ietf.org/html/draft-ietf-mptcp-congestion-07 (13pgs).
Hampel, G. et al., "Enhancements to Improve the Applicability of Multipath TCP to Wireless Access Networks, draft-hampel-mptcp-applicability-wireless-networks-00," Jun. 15, 2011, URL: https://tools.ietf.org/html/draft-hampel-mptcp-applicability-wireless-networks-00 (25pgs).
Barre, S. et al., "Multipath TCP—Guidelines for implementers, draft-barre-mptcp-impl-07," Mar. 7, 2011, URL: https://tools.ietf.org/html/draft-barre-mptcp-impl-00 (41pgs).
Bagnulo, M., "Threats Analysis for TCP Extensions for Multi-path Operations with Multiple Addresses, draft-ietf-mptcp-threat-08," URL: https://tools.ietf.org/html/draft-ietf-mptcp-threat-08 (17pgs).
Ford, A. et al., "Architectural Guidelines for Multipath TCP Development, draft-ietf-mptcp-architecture05," Jan. 1, 2011, URL: https://tools.ieft.org/html/draft-ietf-mptcp-architecture-05 (29pgs).
Scharf, M. et al., "MPTCP Application Interface Considerations, draft-scharf-mptcp-api-04," Nov. 22, 2010, URL: https://tools.ietf.org/html/draft-scharf-mptcp-api-04 (26pgs).
Singh, A. et al., "PayLoad Multi-connection Transport using Multiple Addresses, draft-sign-mptcp-plmt-00.txt," Aug. 6, 2010, URL: https://tools.ietf.org/html/draft-singh-mptcp-plmt-00 (33pgs).
Scharf, M., "Multi-Connection TCP (MCTCP) Transport, draft-scharf-mptcp-mctcp-01," Jul. 12, 2010, URL: https://tools.ietf.org/html/draft/scharf-mptcp-mctcp-01 (35pgs).
Ford, A. et al., "TCP Extensions for Multipath Operation with Multiple Addresses, draft-ford-mptcp-multiaddressed-03," Mar. 8, 2010, URL: https://tools.ietf.org/html/draft-ford-mptcp-multiaddressed-03 (35pgs).
Raiciu, C. et al., "Coupled Multipath-Aware Congestions Control, draft-raiciu-mptcp-congestions-01," Mar. 8, 2010, URL: https://tools.ietf.org/draft-raiciu-mptcp-congestion-01 (11pgs).
Sarolahti, P., "Multi-address Interface in the Socket API, draft-sarolahti-mptcp-af-multipath-01.txt," Mar. 4, 2010, URL: https://tools.ieft.org/html/draft-sarolahti-mptcp-af-multipath-01 (13pgs).
Bagnulo, M., "Threat Analysis for Multi-addressed/Multi-path TCP, draft-bagnulo-mptcp-threat-01," Feb. 8, 2010, URL: https://tools.ietf.org/html/draft-bagnulo-mptcp-threat-01 (13pgs).

(56) References Cited

OTHER PUBLICATIONS

Ford, A., Ed., et al., "Architectural Guidelines for Multipath TCP Development, draft-ford-mptcp-architecture-01," Feb. 3, 2010, URL: https://tools.ietf.org/html/draft-ford-mptcp-architecture-01 (24pgs).
Handley, M., et al., "Outgoing Packet Routing with MP-TCP, draft-handley-mptcp-routing-00.txt," Oct. 19, 2009, URL: https://tools.ietf.org/html/draft-handley-mptcp-routing-00 (14pgs).
Office Action dated Jul. 28, 2015 in Japanese Application No. 2014-545863, (29 pgs).
Exam Report 1 dated Jan. 19, 2015 in Australian Application No. 2011382613, (3 pgs).
Exam Report No. 1 dated Feb. 10, 2017, Response filed May 24, 2017 in Australian Application No. 2016200291, (40 pgs).
Exam Report 2 dated Jun. 19, 2017, Response filed Oct. 17, 2017, Notice of Allowance dated Oct. 20, 2017, in Australian Application No. 2016200291, (34 pgs).
Amendment filed Apr. 11, 2018, Exam Report No.1 dated Feb. 25, 2019, Instruction Jun. 23, 2019 in Australian Application No. 2018200787, (39 pgs).
Exam Report Response filed Sep. 16, 2019, in Australian Application No. 2018200787, (127 pgs).
Response filed Jul. 11, 2019, Notice of Allowance dated Oct. 21, 2019, Grant Certificate Feb. 13, 2020, in Australian Application No. 2018200787, (10 pgs).
Office Action dated Jul. 11, 2014, Response Jan. 21, 2015, 71(3) Oct. 30, 2017, Response Mar. 8, 2018, Allowance Mar. 22, 2018 in European Application No. 11797097.0, (28 pgs).
European Search Report dated Apr. 26, 2018, Exam Report dated Jan. 29, 2020, Response filed Jun. 3, 2020 in European Application No. 18160805.0, (17 pgs).
International Search Report and Written Opinion dated May 13, 2011 in PCT Application No. PCT/US2011/021003, (17 pgs).
Handley, M. et al., "Outgoing Packet Routing with MP-TCP, draft-handley-mptcp-routing-00.txt," Oct. 19, 2009 (14 pgs).
Sarolahti, P., "Multi-address Interface in the Socket API, draft-sarolahti-mptcp-af-multipath-01.txt," Mar. 4, 2010 (13 pgs).
Scharf, M., "Multi-Connection TCP (MCTCP) Transport, draft-scharf-mptcp-mctcp-01," Jul. 12, 2010 (35pgs).
Singh, A. et al., "PayLoad Multi-connection Transport using Multiple Addresses, draft-singh-mptcp-plmt-00.txt," Aug. 6, 2010 (33pgs).
Barre, S. et al., "MultiPath TCP—Guidelines for Implementers, draft-barre-mptcp-impl-00," Mar. 7, 2011 (41pgs).
Hampel, G. et al., "Enhancements to Improve the Applicability of Multipath TCP to Wireless Access Networks, draft-hampel-mptcp-applicability-wireless-networks-00," Jun. 15, 2011 (25pgs).
Bagnulo, M., "Threat Analysis for TCP Extensions for Multipath Operation with Multiple Addresses," Mar. 2011, RFC: 6181, ISSN: 2070-1721, MPTCP Threat Analysis (17pgs).
Ford, A. et al., "Architectural Guidelines for Multipath TCP Development," Mar. 2011, RFC: 6182, ISSN: 2070-1721, MPTCP Architecture (28pgs).
Raiciu C. et al., "Coupled Congestion Control for Multipath Transport Protocols," Oct. 2011, RFC: 6356, ISSN: 2070-1721, MPTCP Congestion Control (12pgs).
Ford, A. et al., "TCP Extensions for Multipath Operation with Multiple Addresses, draft-ietf-mptcp-multiaddressed-04," Jul. 11, 2011, Internet-Draft, Multipath TCP (59pgs).
Ford, A. et al., "TCP Extensions for Multipath Operations with Multiple Addresses," Jan. 2013, RFC 6824, Multipath TCP (64pgs).
Scharf, M. et al., "MPTCP Application Interface Considerations, draft-ietf-mptcp-api-03," Nov. 30, 2011, Internet-Draft, MPTCP API (28pgs).
Scharf, M. et al., "Multipath TCP (MPTCP) Application Interface Considerations," Mar. 2013, RFC 6897, MPTCP API (31pgs).
Bagnulo, M. et al., "Analysis of Residual Threats and Possible Fixes for Multipath TCP (MPTCP)," Jul. 2015 RFC 7430, MPTCP Residual Threats (19pgs).
Bonaventure, O. et al., "Use Cases and Operational Experience with Multipath TCP," Jan. 2017, RFC 8041, MPTCP Experience (30pgs).
Stewart, R. et al., "Stream Control Transmission Protocol (SCTP) Dynamic Address Reconfiguration," Sep. 2007, RFC 5061, SCTP Dynamic Address Reconfiguration (41pgs).
Kumar, N. et al., "Security for 5G, draft-naresh-mptcp-security-for-5g-01.txt," Aug. 4, 2018, Internet-Draft (7pgs).
Shailendra, S. et al., "Extended Socket APIs to control subflow priority in Multipath TCP, draft-samar-ptcp-socketapi-01.txt," Jul. 31, 2018, MPTCP Working Group, Internet-Draft (8pgs).
de Foy, X. et al., "Considerations for MPTCP operation in 5G, draft-defoy-mptcp-considerations-for-5g-01," Jun. 22, 2018, Internet-Draft (14pgs).
Song, F. et al., "One Way Latency Considerations for MPTCP, draft-song-mptcp-owl-04, Jun. 16, 2018," Internet-Draft (11pgs).
Barre, S. et al., "TFO support for Multipath TCP, draft-barre-mptcp-tfo-03, May 29, 2018," Internet-Draft (13pgs).
Ford, A. et al., "TCP Extensions for Multipath Operation with Multiple Addresses, draft-ietf-mptcp-rfc6824bis-11," May 15, 2018, Internet-Draft (77pgs).
Zuo, J. et al., "A Path-Aware Scheduling Scheme for Multipath Transport Protocols, draft-zuo-mptcp-scheduler-01.txt," Mar. 21, 2018, Internet-Draft (9pgs).
Hesmans, B. et al., "A socket API to control Multipath TCP, draft-hesmans-mptcp-socket-03, Mar. 5, 2018," Internet-Draft (19pgs).
Wang, F. et al., "A Proactive Approach to Avoid Performance Degradation of MPTCP, draft-zuo-mptcp-degredation-00," Oct. 30, 2017, Internet-Draft (9pgs).
Purkayastha, D. et al., "Considerations for MPTCP operation in 5G, draft-purkayastha-mptcp-considerations-for-nextgen-00," Oct. 29, 2017 (4pgs).
C. Raiciu et al., "Coupled Congestion Control for Multipath Transport Protocols," draft-ietf-mptcp-congestion-02, Mar. 14, 2011 (13pgs).
C. Raiciu et al., "Coupled Congestiion Control for Multipath Transport Protocols, draft-ietf-mptcp-congestion-01," Jan. 7, 2011 (13pgs).
C. Raiciu et al., "Coupled Multipath-Aware Congestion Control, draft-ietf-mptcp-congestion-00," Jul. 6, 2010 (12pgs).
M. Scharf et al., "MPTCP Application Interface Considerations, draft-ietf-mptcp-api-03," Nov. 30, 2011 (28pgs).
A. Ford et al., "TCP Extensions for Multipath Operation with Multiple Addresses," ISSN: 2070-1721 (65pgs).
A. Ford et al., "TCP Extensions for Multipath Operation with Multiple Addresses, draft-ietf-mptcp-multiaddressed-12," Apr. 25, 2013 (64pgs).
MPTCP Recent articles and software, "Experimenting with MPTCP using raw sockets (Apr. 18, 2018/mobil_tracebox.html)," Apr. 18, 2018 (19pgs).
A. Ford et al., "Architectural Guidelines for Multipath TCP Development, draft-ietf-mptcp-architecture-00," Feb. 28, 2010 (26pgs).
C. Raiciu et al., "Coupled Congestion Control for Multipath Transport Protocols," ISSN: 2070-1721, Oct. 2011 (12pgs).
C. Raiciu et al., "Coupled Congestion Control for Multipath Transport Protocols," ISSN: 2070-1721, Oct. 2011 (13pgs).
C. Raiciu et al., "Coupled Congestion Control for Multipath Transport Protocols, draft-ietf-mptcp-congestion-07," Jul. 29, 2011 (14pgs).
C. Raiciu et al., "Coupled Congestion Control for Multipath Transport Protocols, draft-ieft-mptcp-congestion-06," Jul. 25, 2011 (13pgs).
C. Raiciu et al., "Coupled Congestion Control for Multipath Transport Protocols, draft-ietf-mptcp-congestion-05," Jun. 16, 2011 (13pgs).
C. Raiciu et al., "Coupled Congestion Control for Multipath Transport Protocols, draft-ietf-mptcp-congestion-04," Jun. 15, 2011 (13pgs).
C. Raiciu et al., "Coupled Congestion Control for Multipath Transport Protocols, draft-ietf-mptcp-congestion-03," Apr. 11, 2011 (13pgs).
A. Ford et al., "Architectural Guidelines for Multipath TCP Development, draft-ietf-mptcp-architecture-01," Jun. 22, 2010 (28pgs).
Bagnulo, M., "Threat Analysis for TCP Extensions for Multi-path Operation with Multiple Addresses, draft-ieft-mptcp-threat-08," Jan. 26, 2011, URL: https://tools.ietf.org/html/draft-ietf-mptcp-threat-08 (17pgs).
Bagnulo, M., "Threat Analysis for TCP Extensions for Multi-path Operation with Multiple Addresses draft-ietf-mptcp-threat-07," Jan. 11, 2011, URL: https://tools.ietf.org/html/draft-ietf-mptcp-threat-07 (17pgs).

(56) References Cited

OTHER PUBLICATIONS

Bagnulo, M., "Threat Analysis for Multi-addressed/Multi-path TCP, draft-ietf-mptcp-threat-06," Dec. 7, 2010, URL: https://tools.ietf.org/html/draft-ietf-mptcp-threat-06 (17pgs).
Bagnulo, M., "Threat Analysis for Multi-addressed/Multi-path TCP, draft-ietf-threat-05," Dec. 6, 2010, URL: https://tools.ietf.org/html/draft-ietf-mptcp-threat-05 (17 pgs).
Bagnulo, M., "Threat Analysis for Multi-addressed/Multi-path TCP, draft-ietf-mptcp-threat-04," Nov. 26, 2010, URL: https://tools.ietf.org/html/draft-ietf-mptcp-threat-04 (16pgs).
Bagnulo, M., "Threat Analysis for Multi-addressed/Multi-path TCP, draft-ietf-mptcp-threat-03," Oct. 4, 2010, URL: https://tools.ietf.org/html/draft-ietf-mptcp-threat-03 (16pgs).
Bagnulo, M., "Threat Analysis for Multi-addressed/Multi-path TCP, draft-ietf-mptcp-threat-02," Mar. 29, 2010, URL: https://tools.ietf.org/html/draft-ietf-mptcp-threat-02 (15pgs).
Bagnulo, M., "Threat Analysis for Multi-addressed/Multi-path TCP, draft-ietf-mptcp-threat-01," Mar. 8, 2010, URL: https://tools.ietf.org/html/draft-ietf-mptcp-threat-01 (15pgs).
Wang, F. et al., "A Proactive Approach to Avoid Performance Degradation of MPTCP, draft-zuo-mptcp-degradation-00," URL: https://tools.ietf.org/html/draft-zuo-mptcp-degradation-00 (9pgs).
Purkayastha, D. et al., "Considerations for MPTCP operation in 5G, draft-purkayastha-mptcp-considerations-for-nextgen-00," Oct. 29, 2017, URL: https://tools.ietf.org/html/draft-purkayastha-mptcp-considerations-for-nextgen-00 (7pgs).
Bonaventure, O. et al., "O-RTT TCP Converter, draft-bonaventure-mptcp-converters-02," Oct. 30, 2017, URL: https://tools.ietf.org/html/draft-bonaventure-mptcp-converters-02 (32pgs).
Boucadair, M. et al., "RADIUS Extensions for Network-assisted Multipath TCP (MPTCP), draft-boucadair-mptcp-radius-05," Oct. 8, 2017, URL: https://tools.ietf.org/html/draft-boucadair-mptcp-radius-05 (11pgs).
Boucadair, M. et al., "DHCP Options for Network-Assisted Multipath TCP (MPTCP), draft-boucadair-mptcp-dhc-08," Oct. 8, 2017, URL: https://tools.ietf.org/html/draft-boucadair-mptcp-dhc-08 (13pgs).
Duchene, F. et al., "Multipath TCP Load Balancing, draft-duchene-mptcp-load-balancing-01," URL: https://tools.ietf.org/html/draft-duchene-mptcp-load-balancing-01 (12pgs).
Xu, Changqiao et al., "A Message-Oriented Extension to Multipath Transmission Control Protocol (MPTCP), draft-xu-mptcp-momp-04.txt," URL: https://tools.ietf.org/html/draft-xu-mptcp-momp-04 (14pgs).
Xu, Changqiao et al., "Multipath Transmission Control Protocol (MPTCP) Partial Reliability Extension, draft-xu-mptcp-prmp-04.txt," Jun. 20, 2017, URL: https://tools.ietf.org/html/draft-xu-mptcp-prmp-04 (12pgs).
Leymann, N. et al., "Integration of Bonding Tunnels and MPTCP, draft-zuo-banana-mptcp-integration-00.txt," URL: https://tools.ietf.org/html/draft-zuo-banana-mptcp-integration-00 (12pgs).
Dreibholz, T. et al., "MPTCP Experiences in the NorNet Testbed, draft-dreibholz-mptcp-nornet-experience-04.txt," Mar. 30, 2017, URL: https://tools.ietf.org/html/draft-dreibholz-mptcp-nornet-experience-04 (11pgs).
Boucadair, M. et al., "Extensions for Network-Assisted MPTCP Deployment Models, draft-bouucadair-mptcp-plain-mode-10," Mar. 9, 2017, URL: https://tools.ietf.org/html/draft-boucadair-mptcp-plain-mode-10 (25pgs).
Xu, Mingwei et al., "Delay-based Congestion Control for MPTCP, draft-xu-mptcp-congestion-control-05.txt," Jan. 1, 2017, URL: https://tools.ietf.org/html/draft-xu-mptcp-congestion-control-05 (12pgs).
Boucadair, M. et al., "Network-Assisted MPTCP: Use Cases, Deployment Scenarios and Operational Considerations, draft-nam-mptcp-deployment-considerations-01," Dec. 7, 2016, URL: https://tools.ietf.org/html/draft-nam-mptcp-deployment-considerations-01 (29pgs).
Boucadair, M., "Negotiating the Maximum Number of Multipath TCP (MPTCP) Subflows, draft-boucadair-mptcp-max-subflow-03," Nov. 24, 2016, URL: https://tools.ietf.org/html/draft-boucadair-mptcp-max-subflow-03 (5pgs).

Nguyen, K. et al., "An Improvement of MPTCP Initialization, draft-kien-mptcp-init-00," Oct. 30, 2016, URL: https://tools.ietf.org/html/draft-kien-mptcp-init-00 (5pgs).
Bonaventure, O. et al., "Use Cases and Operational Experience with Multipath TCP, draft-ietf-mptcp-experience-07," Oct. 27, 2016, URL: https://tools.ietf.org/html/draft-ietf-mptcp-experience-07 (36pgs).
Kim, D., "Efficient Design for Secure Multipath TCP against Eavesdropper in Initial Handshake, draft-kim-mptcp-semptcp-00," Oct. 24, 2016, URL: https://tools.ietf.org/html/draft-kim-mptcp-semptcp-00 (16pgs).
Olteanu, V. et al., "Layer 4 Loadbalancing for MPTCP, draft-olteanu-mptcp-loadbalance-00," Jul. 8, 2016, URL: https://tools.ietf.org/html/draft-olteanu-mptcp-loadbalance-00 (7pgs).
Duchene, F. et al., "Multipath TCP Address Advertisement, draft-duchene-mptcp-add-addr-00," Jul. 8, 2016, URL: https://tools.ietf.org/html/draft-duchene-mptcp-add-addr-00 (13pgs).
Peirens, B. et al., "Link bonding with transparent Multipath TCP, draft-peirens-mptcp-transparent-00," Jul. 5, 2016, URL: https://tools.ietf.org/html/draft-pirens-mptcp-transparent-00 (21pgs).
Barik, R. et al., "A Linked Slow-Start Algorithm for MPTCP, draft-barik-mptcp-lisa-01," Jun. 27, 2016, URL: https://tools.ietf.org/html/draft-barik-mptcp-lisa-01 (8pgs).
Paasch, C. et al., "TLS Authentication for MPTCP, draft-paasch-mptcp-tis-authentication-00," May 27, 2016, URL: https://tools.ietf.org/html/draft-paasch-mptcp-tis-autentication-00 (5pgs).
Paasch, C. et al., "Application Layer Authentication for MPTCP, draft-paasch-mptcp-application-authentication-00," May 27, 2016, URL: https://tools.ietf.org/html/draft-paasch-mptcp-application-autehntication-00 (8pgs).
Winter, R. et al., "Multipath TCP Support for Single-Homed End-systems, draft-wr-mptcp-single-homed-07," Mar. 21, 2016, URL: https://tools.ieft.org/html/draft-wr-mptcp-single-homed-07 (8pgs).
Walid, A. et al., "Balanced Linked Adaptation Congestion Control Algorithm for MPTCP, draft-walid-mptcp-congestion-control-04," Jan. 23, 2016, URL: https://tools.ietf.org/html/draft-walid-mptcp-congestion-control-04 (11pgs).
Duchene, F. et al., "Multipath TCP MIB, draft-duchene-mptcp-mib-00," Oct. 19, 2015, URL: https://tools.ietf.org/html/draft-duchene-mptcp-mib-00 (10pgs).
Palanivelan, A. et al., "MPTCP Enhancement Opportunities, draft-palanivelanchetansenthil-mptcp-enhancements-00," Oct. 17, 2015, URL: https://tools.ietf.org/html/draft-palanivelanchetansenthil-mptcp-enhancement-00 (8pgs).
Paasch, C. et al., "Making Multipath TCP robust for Stateless webserves, draft-paasch-mptcp-syncookies-02," Oct. 14, 2015, URL: https://tools.ietf.org/html/draft-paasch-mptcp-syncookies-02 (13pgs).
Paasch, C. et al., "Multipath TCP behind Layer-4 loadbalancers, draft-paasch-mptcp-loadbalancer-00," Sep. 7, 2015, URL: https://tools.ietf.org/html/draft-paasch-mptcp-loadbalanacer-00 (8pgs).
Bonaventure, O., "Supporting long TCP options in Multipath TCP, draft-bonaventure-mptcp-long-options-00," Jul. 6, 2015, URL: https://tools.ietf.org/html/draft-bonaventure-mptcp-long-options-00 (20pgs).
Boucadair, M. et al., "Probing MPTCP subflows, draft-boucadair-mptcp-probe-subflow-00," Jul. 6, 2015, URL: https://tools.ietf.org/html/draft-boucadair-mptcp-probe-subflow-00 (7pgs).
Bonaventure, O. et al., "Improving Multipath TCP Backup Subflows, draft-bonaventure-mptcp-backup-00," Jul. 6, 2015, URL: https://tools.ietf.org/html/draft-bonaventure-mptcp-backup-00 (11pgs).
Bonaventure, O. et al., "Multipath TCP Address Advertisement, draft-bonaventure-mptcp-addr-00," Jul. 6, 2015, URL: https://tools.ietf.org/html/draft-bonaventure-mptcp-addr-00 (9pgs).
Boucadair, M. et al., "An MPTCP Profile for NAT-and Firewall-Free Networks: Network-Assisted MPTCP Deployments, draft-boucadair-mptcp-natfwfree-profile-00," Jul. 3, 2015, URL: https://tools.ietf.org/html/draft-boucadair-mptcp-natfwfree-profile-00 (11pgs).
Bonaventure, O. et al., "Multipath TCP timestamp option, draft-bonaventure-mptcp-timestamp-01," Jul. 2, 2015, URL: https://tools.ietf.org/html/draft-bonaventure-mptcp-timestamp-01 (6pgs).
Wei, X et al., "MPTCP proxy mechanisms, draft-wei-mptcp-proxy-mechanism-02," Jul. 1, 2015, URL: https://tools.ietf.org/html/draft-wei-mptcp-proxy-mechanism-02 (11pgs).

(56) References Cited

OTHER PUBLICATIONS

Palanivelan, A. et al., "MPTCP Implementation (Challenges) Usecases, draft-palanivelanchetan-mptcp-challenges-usecases-00," Jun. 29, 2015, URL: https://tools.ietf.org/html/draft-palanivelanchetan-mptcp-challenges-usecases-00 (5pgs).
Boucadair, M. et al., "Negotiating the Maximum Number of MPTCP Subflows, draft-boucadair-mptcp-extensions-00," Jun. 16, 2015, URL: http//tools.ietf.org/html/draft-boucadair-mptcp-extensions-00 (5pgs).
Bonaventure, O. et al., "Experimental Multipath TCP option, draft-bonaventure-mptcp-exp-option-00," Jun. 16, 2015, URL: https://tools.ietf.org/html/draft-bonaventure-mptcp-exp-option-00 (8pgs).
Krupakaran, Kesava et al., "Optimized Multipath TCP subflows using Traceflow, draft-aravind-mptcp-optimized-subflows-00," Apr. 7, 2015, URL: https://tools.ietf.org/html/draft-aravind-mptcp-optimized-subflows-00 (10pgs).
Bagnulo, M. et al., "Analysis of MPTCP residual threats and possible fixes, draft-ietf-mptcp-attacks-04," Mar. 27, 2015, URL: https://tools.ietf.org/html/draft-ietf-mptcp-attacks-04 (18pgs).
Boucadair, M. et al., "An Extensions to MPTCP for Symmetrical Sub-Flow Management, draft-boucadair-mptcp-symmetric-02," Mar. 9, 2015, URL: https://tools.ietf.org/html/draft-boucadair-mptcp-symmetric-02 (7pgs).
Boucadair, M. et al., "MPTCP Connectivity Checks, draft-boucadair-mptcp-connectivity-checks-00," Mar. 4, 2015, URL: https://tools.ietf.org/html/draft-boucadair-mptcp-connectivity-checks-00 (9pgs).
Lopez, E. et al., "Multipath TCP Middlebox Behavior, draft-lopez-mptcp-middlebox-00," Nov. 11, 2014, URL: https://tools.ietf.org/html/draft-lopez-mptcp-middlebox-00 (8pgs).
Bonaventure, O. et al., "MPTLS : Making TLS and Multipath TCP stronger together, draft-bonaventure-mptcp-tls-00," Oct. 27, 2014, URL: https://tools.ietf.org/html/draft-bonaventure-mptcp-tls-00 (21pgs).
Deng, L. et al., "Use-cases and Requirements for MPTCP Proxy in ISP Networks, draft-deng-mptcp-proxy-01," Oct. 24, 2014, URL: https://tools.ietf.org/html/draft-deng-mptcp-proxy-01 (18pgs).
Khalili, Ramin et al., "Opportunistic Linked-Increases Congestion Control Algorithm for MPTCP, draft-khalili-mptcp-congestion-control-05," Jul. 4, 2014, URL: https://tools.ietf.org/html/draft-khalili-mptcp-congestion-control-05 (11pgs).
Khalili, Ramin et al., "Performance Issues with MPTCP, draft-khalili-mptcp-performance-issues-06," URL: https://tools.ietf.org/html/draft-khalili-mptcp-performance-issues-06 (17pgs).
Bonaventure, O. et al., "Processing of RST segments by Multipath TCP, draft-bonaventure-mptcp-rst-00," Jul. 3, 2014, URL: https://tools.ietf.org/html/draft-bonaventure-mptcp-rst-00 (12pgs).
Bonaventure, O. et al., Experience with Multipath TCP, draft-bonaventure-mptcp-experience-00, Jul. 1, 2014, URL: https://tools.ietf.org/html/draft-bonaventure-mptcp-experience-00 (19pgs).
Bagnulo, M., "Threat Analysis for Multi-addressed/Multi-path TCP, draft-ietf-mptcp-threat-00," Feb. 18, 2010, URL: https://tools.ietf.org/html/draft-ietf-mptcp-threat-00 (13pgs).
Ford, A. et al., "Architectural Guidelines for Multipath TCP Development, draft-ietf-mptcp-architecture-05," Jan. 21, 2011, URL: https://tools.ietf.org/html/draft-ietf-mptcp-architecture-05 (29pgs).
Ford, A. et al., "Architectural Guidelines for Multipath TCP Development, draft-ietf-mptcp-architecture-04," Jan. 11, 2011, URL: https://tools.ietf.org/html/draft-ietf-mptcp-architecture-04 (28pgs).
Ford, A. et al., "Architectural Guidelines for Multipath TCP Development, draft-ietf-mptcp-architecture-03," Dec. 8, 2010, URL: https://tools.ietf.org/html/draft-ietf-mptcp-architecture-03 (27pgs).
Ford, A. et al., "Architectural Guidelines for Multipath TCP Development, draft-ietf-mptcp-architecture-02," Oct. 16, 2010, URL: https://tools.ietf.org/html/draft-ietf-mptcp-architecture-02 (25pgs).
Ford, A. et al., "Architectural Guidelines for Multipath TCP Development, draft-ietf-mptcp-architecture-01," Jun. 22, 2010, URL: https://tools.ietf.org/html/draft-ietf-mptcp-architecture-01 (27pgs).
Ford, A. et al., "Architectural Guidelines for Multipath TCP Development, draft-ietf-mptcp-architecture-00," Feb. 28, 2010, URL: https://tools.org/html/draft-ietf-mptcp-architecure-00 (25pgs).
Raiciu, C. et al., "Coupled Congestion Control for Multipath Transport Protocols, draft-ietf-mptcp-congestion-06," Jul. 25, 2011, URL: https://tools.ietf.org/html/draft-ietf-mptcp-congestion-06 (12pgs).
Raiciu, C. et al., "Coupled Congestion Control for Multipath Transport Protocls, draft-ietf-mptcp-congestion-05," Jun. 16, 2011, URL: https://tools.ietf.org/html/draft-ietf-mptcp-congestion-05 (12pgs).
Raiciu, C. et al., "Coupled Congestion Control for Multipath Transport Protocols, draft-ietf-mptcp-congestion-04," Jun. 15, 2011, URL: https://tools.ietf.org/html/draft-mptcp-congestion-04 (12pgs).
Raiciu, C. et al., "Coupled Congestion Control for Multipath Transport Protocols, draft-ietf-mptcp-congestion-03," Apr. 11, 2011, URL: https://tools.ietf.org/html/draft-ietf-mptcp-congestion-03 (12pgs).
Raiciu, C. et al., "Coupled Congestion Control for Multipath Transport Protocols, draft-ietf-mptcp-congestion-02," Mar. 14, 2011, URL: https://tools.ietf.org/html/draft-ietf-mptcp-congestion-02 (12pgs).
Raiciu, C. et al., "Coupled Congestion Control for Multipath Transport Protocols, draft-ietf-mptcp-congestion-01," Jan. 7, 2011, URL: https://tools.ietf.org/html/draft-ietf-mptcp-congestion-01 (12pgs).
Raiciu, C. et al., "Coupled Congestion Control for Multipath Transport Protocols, draft-ietf-mptcp-congestion-00," Jul. 6, 2010, URL: https://tools.ietf.org/html/draft-ietf-mptcp-congestion-00 (11pgs).
A. Ford et al., "TCP Extensions for Multipath Operation with Multiple Addresses, draft-ietf-mptcp-multiaddressed-12," Oct. 22, 2012, URL: https://tools.ietf.org/html/draft-ietf-mptcp-multiaddressed-12 (63pgs).
A. Ford et al., "TCP Extensions for Multipath Operation with Multiple Addresses, draft-ietf-mptcp-multiaddressed-11," Oct. 19, 2012, URL: https://tools.ietf.org/html/draft-ietf-mptcp-multiaddressed-11 (65pgs).
A. Ford et al., "TCP Exxtensions for Multipath Operation with Multiple Addresses, draft-ietf-mptcp-multiaddressed-10," Oct. 3, 2012, URL: https://tools.ietf.org/html/draft-ietf-mptcp-multiaddressed-10 (64pgs).
A. Ford et al., "TCP Extensions for Multipath Operation with Multiple Addresses, draft-ietf-mptcp-multiaddressed-09," Jun. 6, 2012, URL: https://tools.ietf.org/html/draft-ietf-mptcp-multiaddressed-09 (62pgs).
A. Ford et al., "TCP Extensions for Multipath Operation with Multiple Addresses, draft-ietf-mptcp-multiaddressed-08," May 25, 2012, URL: https://tools.ietf.org/html/draft-ietf-mptcp-multiaddressed-08 (62pgs).
A. Ford et al., "TCP Extensions for Multipath Operation with Multiple Addresses, draft-ietf-mptcp-multiaddressed-07," Mar. 26, 2012, URL: https://tools.ietf.org/html/draft-ietf-mptcp-multiaddressed-07 (62pgs).
A. Ford et al., "TCP Extensions for Multipath Operation with Multiple Addresses, draft-ietf-mptcp-multiaddressed-06," Jan. 31, 2012, URL: https://tools.ietf.org/html/draft-ietf-mptcp-multiaddressed-06 (60pgs).
A. Ford et al., "TCP Extensions for Multipath Operation with Multiple Addresses, draft-ietf-mptcp-multiaddressed-05," Jan. 12, 2012, URL: https://tools.ietf.org/html/draft-ietf-mptcp-multiaddressed-05 (59pgs).
A. Ford et al., "TCP Extensions for Multipath Operation with Multiple Addresses, draft-ietf-mptcp-multiaddressed-04," Jul. 11, 2011, URL: https://tools.ietf.org/html/draft-ietf-mptcp-multiaddressed-04 (59pgs).
A. Ford et al., "TCP Extensions for Multipath Operation with Multiple Addresses, draft-ietf-mptcp-multiaddressed-03," Mar. 14, 2011, URL: https://tools.ietf.org/html/draft-ietf-mptcp-multiaddressed-03 (54pgs).
A. Ford et al., "TCP Extensions for Multipath Operation with Multiple Addresses, draft-ietf-mptcp-multiaddressed-02," Oct. 25, 2010, URL: https://tools.ietf.org/html/draft-ietf-mptcp-multiaddressed-02 (44pgs).
A. Ford et al., "TCP Extensions for Multipath Operation with Multiple Addresses, draft-ietf-mptcp-multiaddressed-01," Jul. 12, 2010, URL: https://tools.ietf.org/html/draft-ietf-mptcp-multiaddressed-01 (43pgs).
A. Ford et al., "TCP Extensions for Multipath Operation with Multiple Addresses, draft-ietf-mptcp-multiaddressed-00," Jun. 21, 2010, URL: https://tools.ietf.org./html/draft-ietf-mptcp-multiaddressed-00 (42pgs).

(56) References Cited

OTHER PUBLICATIONS

Scharf, M. et al., "Multipath TCP (MPTCP) Application Interface Considerations, draft-ietf-mptcp-api-07," Jan. 19, 2013, URL: https://tools.ietf.org/html/draft-ietf-mptcp-api-07 (34pgs).
Scharf, M. et al., "Multipath TCP (MPTCP) Application Interface Considerations, draft-ietf-mptcp-api-06," Oct. 22, 2012, URL: https://tools.ietf.org/html/draft-ietf-mptcp-api-06 (30pgs).
Scharf, M. et al., "Multipath TCP (MPTCP) Application Interface Considerations, draft-ietf-mptcp-api-05," Apr. 17, 2012, URL: https://tools.ietf.org/html/draft-ietf-mptcp-api-05 (30pgs).
Scharf, M. et al., "Multipath TCP (MPTCP) Application Interface Considerations, draft-ietf-mptcp-api-04," Feb. 16, 2012, URL: https://tools.ietf.org/html/draft-ietf-mptcp-api-04 (29pgs).
Scharf, M. et al., "Multipath TCP (MPTCP) Application Interface Consideration, draft-ietf-mptcp-api-03," Nov. 30, 2011, URL: https://tools.ietf.org/html/draft-ietf-mptcp-api-03 (28pgs).
Scharf, M. et al., "Multipath TCP (MPTCP) Application Interface Considerations, draft-ietf-mptcp-api-02," Jun. 7, 2011, URL: https://tools.ietf.org/html/draft-ietf-mptcp-api-02 (28pgs).
Scharf, M. et al., "Multipath TCP (MPTCP) Application Interface Considerations, draft-ietf-mptcp-api-01," Mar. 14, 2011, URL: https://tools.ietf.org/html/draft-ietf-mptcp-api-01 (27 pgs).
Scharft, M. et al., "Multipath TCP (MPTCP) Application Interface Considerations, draft-ietf-mptcp-api-00," Nov. 29, 2010, URL: https://tools.ietf.org/html/draft-ietf-mptcp-api-00 (26pgs).
IETF 82 Proceedings, "Multipath TCP (mptcp) (WG)," Taipei, Taiwan, Nov. 13-18, 2011, URL: https://ww.ietf.org/proceedings/82/mptcp.html (3pgs).
IETF 81 Proceedings, "Multipath TCP (mptcp) (WG)" Quebec, Canada, Jul. 24-29, 2011, URL: https://ietf.org/proceedings/81/mptcp.html (3pgs).
Scharf, Michael et al., "draft-ietf-mptcp-api-02" Jul. 27, 2011, URL: https://www.ietf.org/proceedings/81/slides/mptcp-0.pdf (3pgs).
Nishida, Y. et al., "MPTCP—MULTIPATH TCP," WG meeting #7, Jul. 27, 2011, Quebec, IETF-81, URL: https://www.ietf.org/proceedings/81/slides/mptcp-1.pdf (7pgs).
Raiciu, C. et al., "Multipath TCP Congestion Control, draft-ietf-mptcp-congestion-06," URL https://ietf.org/proceedings/81/slides/mptcp-2.pdf (19pgs).
IETF 80 Proceeings, "Multipath TCP (mptcp) (WG)" Prague, Czech Republic, Mar. 27-Apr. 1, 2011, URL: https://www.ietf.org/proceedings/80/mptcp.html (3pgs).
Nishida, Y. et al., "MPTCP—MULTIPATH TCP," WG meeting #6, Mar. 31, 2011, Prague, ietf-80, URL: https://www.ietf.org/proceedings/80/slides/mptcp-0.pdf (7pgs).
Winter, Rolf et al., "Autoconfiguring single-homed end systems to make sure of network multi-homing," URL: https://www.ietf.org/proceedings/80/slides/mptcp-1.pdf (8pgs).
Scharf, Michael et al., "draft-ietf-mtcp-api-01," URL: https://www.ietf.org/proceedings/80/slides/mptcp-2.pdf (7pgs).
Barre, Sebastien et al., "Multipath TCP—Guidesline for Implentment-ers, draft-barre-mptcp-impl-00.txt," IETF 80—Prague, Mar. 31, 2011, URL: https://ietf.org/proceedings/80/slides/mtcp-3.pdf (17pgs).
Handley, Mark "mptcp proxies," URL: https://www.ietf.org/proceedings/80/slides/mptcp-4.pdf (14pgs).
Ford, A. et al., "MPTCP Protocol—Updates, draft-ietf-mptcp-multiaddressed-03," httpps://www.ietf.org/proceeings/80/slides/mptcp-5.pdf (11pgs).
Scharf, Michael et al., "draft-ietf-mptcp-api-01," URL: https://www.ietf.org/proceeings/80/slides-mptcp-6.pdf (7pgs).
"mptcp congestion control, draft-ietf-mptcp-congestion-0?," URL: https://www.ietf.org/proceedings/80/slides/mptcp-9.pdf (4pgs).
Chinese Office Action dated Jul. 20, 2021 in the related Chinese Patent Application No. 201811414162.4, (7 pgs).
Response to Chinese Office Action filed Sep. 12, 2021 in the related Chinese Patent Application No. 201811414162.4, (2 pgs).
Canadian Office Action dated Aug. 9, 2021 in the related Canadian Patent Application No. 3,084,410, (3 pgs).

\* cited by examiner

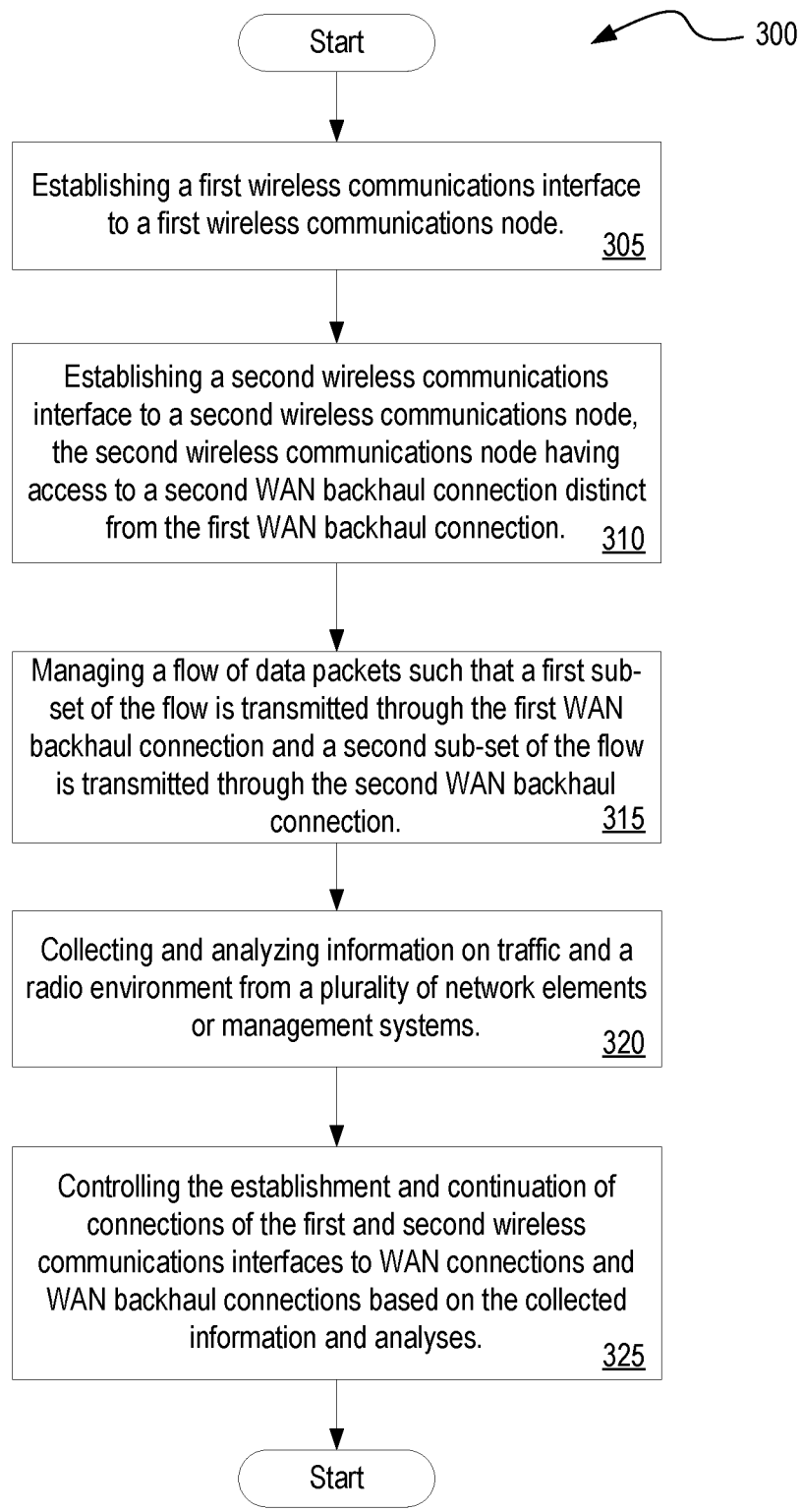

OPTIMIZED CONTROL SYSTEM FOR AGGREGATION OF MULTIPLE BROADBAND CONNECTIONS OVER RADIO INTERFACES

CROSS-REFERENCE TO RELATED APPLICATIONS

This application is a Continuation of previously filed and copending patent application Ser. No. 14/431,774, entitled "OPTIMIZED CONTROL SYSTEM FOR AGGREGATION OF MULTIPLE BROADBAND CONNECTIONS OVER RADIO INTERFACES," naming as inventors Kenneth J. Kerpez and Mung Chiang, and filed 2015 Mar. 27, which is a U.S. National Phase Application Under 35 U.S.C. § 371 of International Patent Application No. PCT/US2012/058157, entitled "OPTIMIZED CONTROL SYSTEM FOR AGGREGATION OF MULTIPLE BROADBAND CONNECTIONS OVER RADIO INTERFACES," naming as inventors Kenneth J. Kerpez and Mung Chiang, and filed 2012 Sep. 29, which applications are hereby incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to apparatus, systems and methods for implementing and using optimized control systems for aggregation of multiple broadband connections over radio interfaces.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In computer networking, a wireless access point (WAP) is a device that allows wireless devices to connect to a wired network using Wi-Fi, Bluetooth or other related standards. The wireless access point usually connects to a router or operates as a router itself.

Wireless access points are commonplace, however, conventional offerings of such wireless access points fail to operate in the most efficient manner possible, and may be improved upon in a multitude of ways.

The present state of the art may therefore benefit from apparatuses, systems and methods for implementing and using optimized control systems for aggregation of multiple broadband connections over radio interfaces as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 3A is a flow diagram illustrating a method for implementing and using optimized control systems for aggregation of multiple broadband connections over radio interfaces in accordance with described embodiments;

DETAILED DESCRIPTION

Figure 1A:
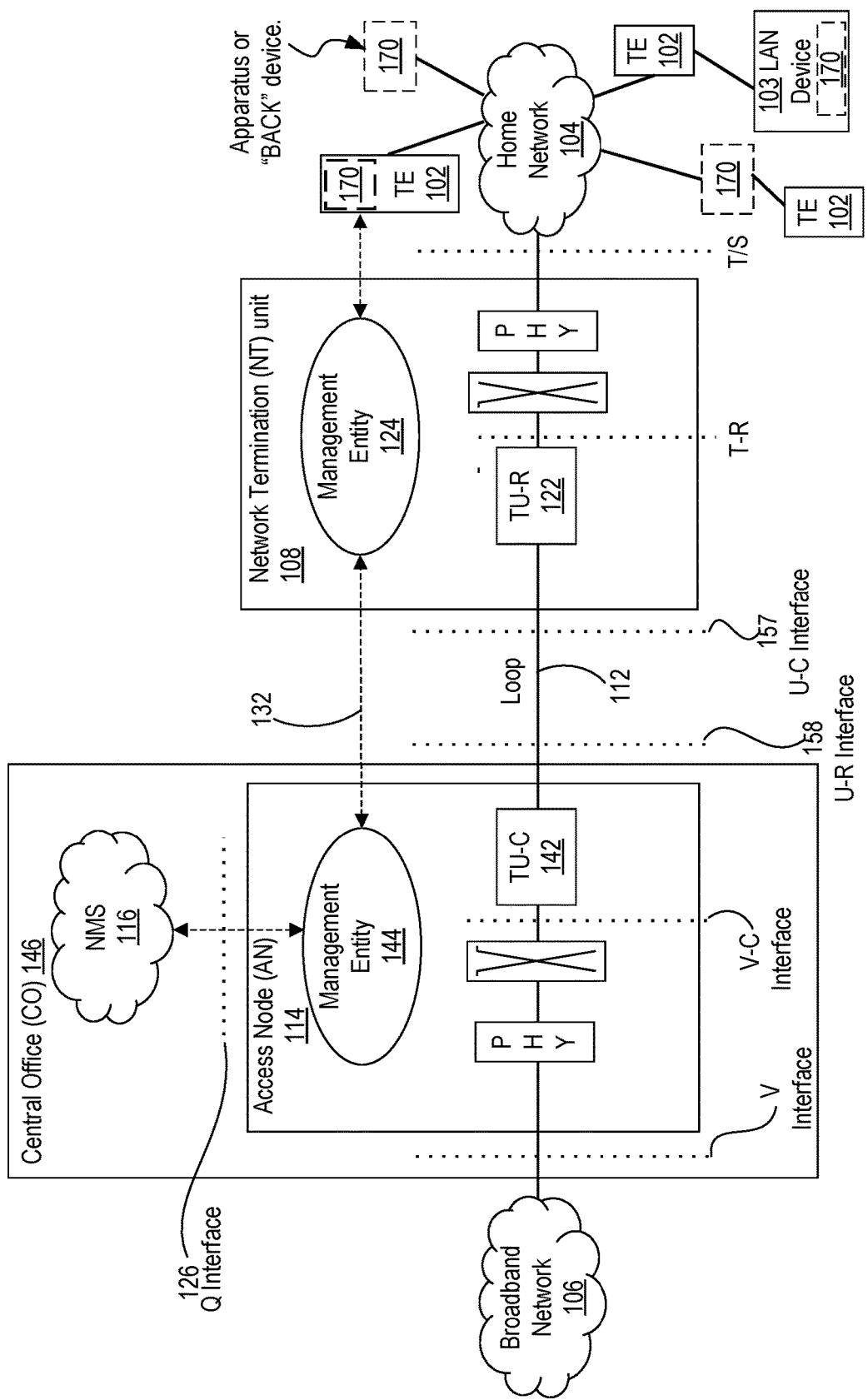
FIG. 1A illustrates an exemplary architecture in which embodiments may operate.

Described herein are apparatus, systems and methods for implementing and using optimized control systems for aggregation of multiple broadband connections over radio interfaces.

In accordance with one embodiment, an exemplary system may include: a processor and a memory to perform instructions embodied by the system; a plurality of antennas; a traffic coordinator to interface to two or more wireless communications nodes together, through the system, in which each of the wireless communications nodes have access to a wide Area Network (WAN) backhaul connection independent of the system; a first wireless communications interface to a first wireless communication node established via a first of the plurality of antennas, the first wireless communications node having access to a first WAN backhaul connection; a second wireless communications interface to a second wireless communications node established via a second of the plurality of antennas, the second wireless communications node having access to a second WAN backhaul connection distinct from the first WAN backhaul connection; and a control module to receive information on traffic flows through the system and a radio environment within which the system operates, in which the control module to: issue commands to control the formation and continuation of connections of the first and second wireless communications interfaces to WAN connections and WAN backhaul connections, and to further provide scheduling and routing instructions for the WAN connections and WAN backhaul connections.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

In performing the disclosed functions, systems may utilize a variety of operational data (which includes performance data) that is available at an Access Node (AN).

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each TU-R 122 in a system may be coupled with a TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112, which in the case of ADSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the Operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). Interface 157 provides TU-C 142 near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs.

Depicted within FIG. 1 is apparatus 170 operating at various optional locations in accordance with several alternative embodiments. For example, in accordance with one embodiment, apparatus 170 is located within home network 104, such as within a LAN. In one embodiment apparatus 170 operates as a DSL modem, such as a Customer Premises (CPE) modem. In another embodiment, apparatus 170 operates as a controller card or as a chipset within a user's terminal equipment 102 (e.g., a Customer Premises Equipment (CPE) device or a remote terminal device, network node, LAN device, etc.) coupled to the home network 104 as depicted. In another embodiment, apparatus 170 operates as a separate and physically distinct stand alone unit which is connected between the user's terminal equipment 102 and a DSL line or loop. In one embodiment, apparatus 170 operates within an Access Point (AP), within a Wireless Access Point (WAP), or within a router (e.g., a WiFi router or other wireless technology router). In one embodiment, apparatus 170 embodies a Broadband AP Control Keeper or "BACK" as is described herein.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For example, Public Switched Telephone Network (PSTN) used to provide DSL services to customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.ads12) for ADSL2 modems, I.T.U. standard G.992.5 (a.k.a. G.ads12plus) for ADSL2+ modems, I.T.U. standard G.993.1 (a.k.a. G.vds1) for VDSL modems, I.T.U. standard G.993.2 for VDSL2 modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it shall be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2 shows a diagrammatic representation of a system 200 in which embodiments may operate, be installed, integrated, or configured, including various components of such a system 200 interconnected via a bus 215 communication means.

According to one embodiment, such a system 200 includes a processor 290 and a memory 295 to perform instructions embodied by the system 200. In such an embodiment, the system 200 further includes a plurality of antennas 211A and 211B and a traffic coordinator 220 to interface to two or more wireless communications nodes 299A and 299B together, through the system 200, in which each of the wireless communications nodes have access to a wide Area Network (WAN) backhaul connection 298A and 298B independent of the system 200. For example, the wireless communication nodes 299A and 299B are depicted as being indirectly interfaced as noted by element 297, or stated differently, they are interfaced together not by communicating directly with each other, but rather, by communicating through an intermediary, depicted here as system 200. In this embodiment, each of the depicted wireless communication nodes 299A and 299B has access to a WAN backhaul as depicted by elements 298A and 298B. Notably, the WAN backhaul 298A and 298B connections are accessible to the respective wireless communication nodes 299A and 299B without having to rely upon the system 200, and thus, the WAN backhaul 298A and 298B are said to be independent of the system 200.

In such an embodiment, the system 200 further includes: a first wireless communications interface 212A to a first wireless communication node 299A established via a first of the plurality of antennas 211A, the first wireless communications node having access to a first WAN backhaul connection 298A and a second wireless communications interface 212B to a second wireless communications node 299B established via a second of the plurality of antennas 211B, the second wireless communications node having access to a second WAN backhaul connection 298B distinct from the first WAN backhaul connection 298A.

According to such an embodiment, the system 200 further includes a control module 260 to receive information 222 on traffic flows 221 through the system 200 and a radio environment 250 within which the system 200 operates.

According to such an embodiment, the control module 260 issues commands 223 to control the formation and continuation of connections (e.g., the wireless communication interfaces 212A and 212B) of the first and second wireless communications interfaces to the WAN connections and WAN backhaul connections (e.g., 298A and 298B), and the control module 260 further provides scheduling and routing instructions 224 for the WAN connections and WAN backhaul connections (e.g., 298A and 298B).

According to one embodiment, the system 200 embodies a "Broadband Access point Control Keeper system," a "B.A.C.K. System," a "BACK system," or a "BACK device." According to one embodiment, the apparatus or BACK device depicted at element 170 of FIG. 1 is embodied within such a system 200.

According to one embodiment, the control module 260 is embodied within such a BACK system, in which the BACK system controls settings at the first wireless communications node 299A, controls settings at the second wireless communications node 299B or controls settings at both the first and second wireless communications nodes 299A and 299B, in which the settings are selected from the following: radio link connection settings affecting the respective first or second first wireless communications interface 212A or 212B; channel assignments affecting the respective first or second first wireless communications interface 212A or 212B; broadband connection settings affecting the respective first or second WAN backhaul connection 298A or 298B; connection assignments among network stations (STAs), network Access Points (APs), and broadband backhaul connections at the STAs and/or APs through which access to the respective first or second WAN backhaul connection 298A or 298B is provided; Internet Protocol (IP) address assignments for the flow of data packets 221; IP address assignments for a first and a second sub-set of the flow of data packets 221; Quality of Service (QoS) classifications for the flow of data packets 221; QoS classifications for the respective first and second sub-sets of flows; QoS throttling parameters for the flow of data packets, the respective first and second sub-sets of flows 221, or both; routing of the respective first and second sub-sets of flows 221 according to available WAN backhaul connections 298A and 298B and timeslots on the available WAN backhaul connections 298A and 298B; load balancing parameters affecting the flow of data packets 221, the respective first and second sub-sets of flows 221, or both; and fairness criteria for all traffic processed by the first wireless communication node 299A, the second wireless communication node 299B or both the first and second wireless communication nodes 299A and 299B.

According to one embodiment, the first wireless communications node (299A) is embodied within a network router, in which the network router establishes connectivity to the first WAN backhaul connection 298A, and further in which the system 200 establishes access to the first WAN backhaul connection 298A through the first wireless communications interface 212A to the network router.

According to one embodiment, the first wireless communications node (299A) is embodied within a modem directly interfaced to the first WAN backhaul connection 298A, in which the system 200 establishes access to the first WAN backhaul connection 298A through the modem.

According to one embodiment, a flow of data packets through the system 200 is managed by the traffic coordinator 220 of the system 200 such that a first sub-set of the flow (e.g., some but not all of 221) is routed through the first WAN backhaul connection 298A and a second sub-set of the flow is routed through the second WAN backhaul connection 298B.

According to another embodiment, the flow of data packets 221 through the system 200 managed by the traffic coordinator 220 constitutes the traffic coordinator 220 managing the flow of data packets 221 by apportioning timeslots of the respective first or second WAN backhaul connection 298A-B to carry the respective first or second sub-set of the flow 221.

According to another embodiment, each respective first or second sub-set of the flow of data packets 221 is allocated by the traffic coordinator 220 of the system 200 to be serviced by one of the first or second WAN backhaul connections 298A-B on the basis of: traffic associated with an application; traffic associated with an interface; traffic associated with a service designation; and traffic associated with a Quality of Service (QoS) tag.

According to another embodiment, the first and second wireless communications interfaces 212A-B with the system 200 are frequency-multiplexed, each of the first and second wireless communications interfaces 212A-B being associated with separate frequency bands managed by the system 200. For example, the separate frequency bands may be dictated by the traffic coordinator 220 of the system 200. In such an embodiment, the system 200 further provides an aggregated WAN backhaul connection via the first and second wireless communications interfaces 211A-B to the respective first and second WAN backhaul connections 298A-B using the frequency bands as managed by the system 200. Unlike time division, frequency channels may overlap somewhat, at least in the roll-off.

According to another embodiment, the first and second wireless communications interfaces 212A-B with the system 202 are time-multiplexed, each of the first and second wireless communications interfaces 212A-B being associated with non-overlapping time-slots managed by the system. According to such an embodiment, the system 200 further provides an aggregated WAN backhaul connection through the first and second wireless communications interfaces 212A-B to the respective first and second WAN backhaul connections 298A-B using the non-overlapping time slots as managed by the system 200.

According to one embodiment, such time-slots are strictly non-overlapping with one another, distinguished from the frequency-multiplexed having frequency channels that may overlap. According to one embodiment, the non-overlapping time-slots are further characterized insomuch that each has at least some guard-time between them.

According to one embodiment, the flow of packets 221 is managed by allocating the first sub-set of the flow 221 to time-slots carried by the first WAN backhaul connection 298A and further by allocating the second sub-set of the flow 221 to time-slots carried by the second WAN backhaul connection 298B.

Figure 2A:
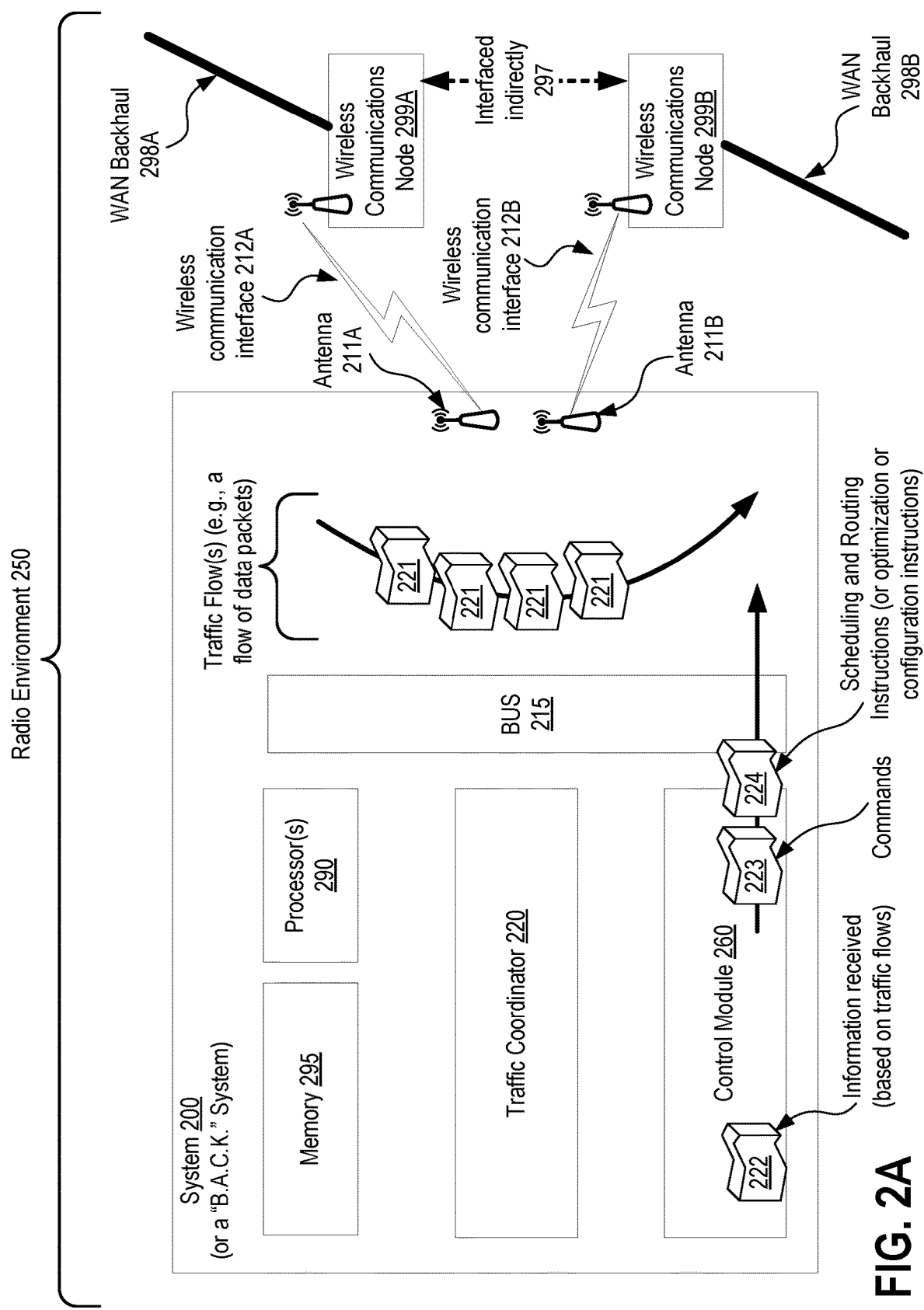
FIG. 2A shows a diagrammatic representation of a system in which embodiments may operate, be installed, integrated, or configured.
Figure 2B:
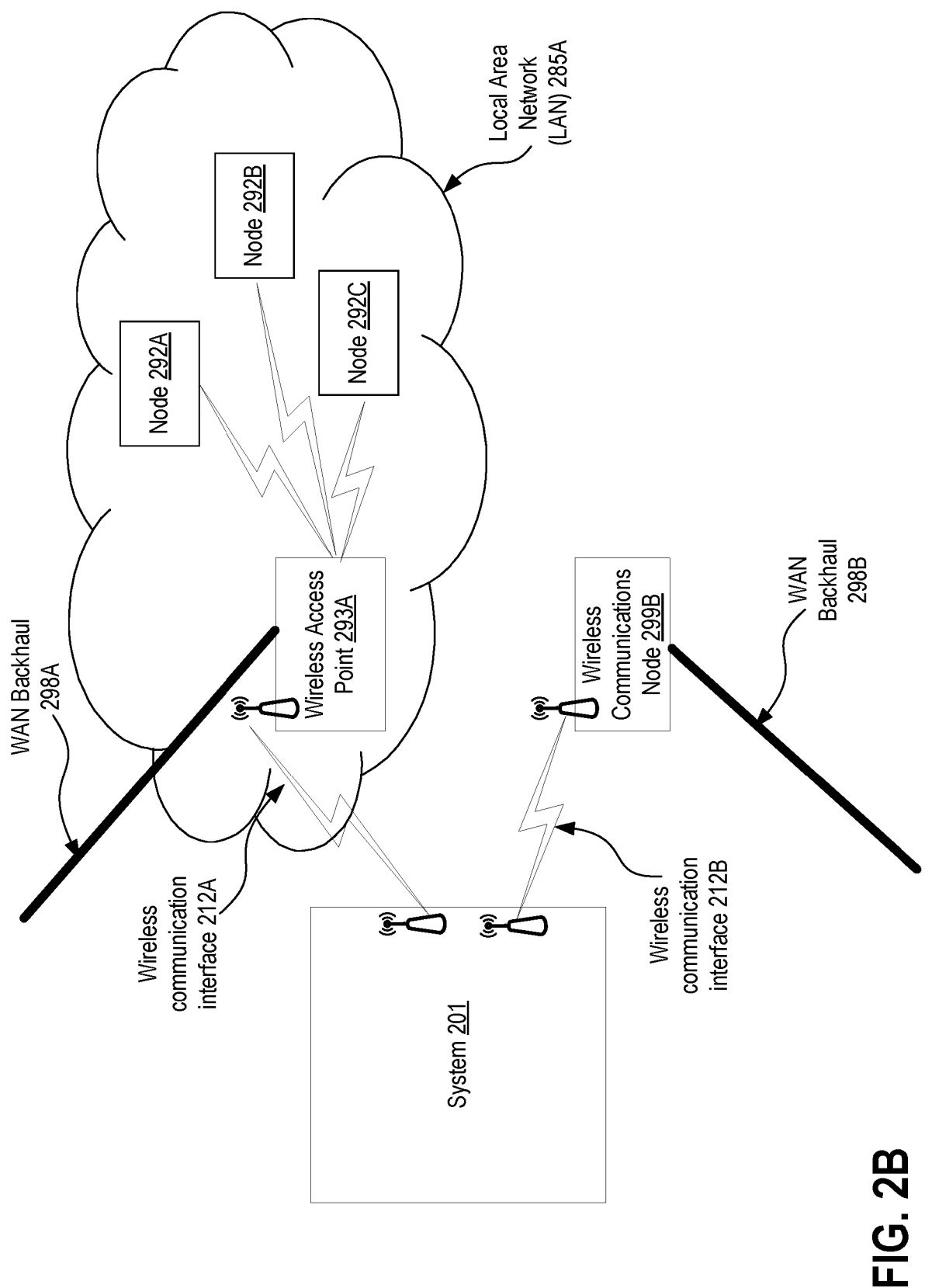
FIG. 2B shows an alternative diagrammatic representation of a system in which embodiments may operate, be installed, integrated, or configured.

FIG. 2B shows an alternative diagrammatic representation of a system 201 in which embodiments may operate, be installed, integrated, or configured.

According to one embodiment, the first wireless communications node (e.g., 299A at FIG. 2A) is embodied within a wireless Access Point (wireless AP) 293A, in which the wireless AP 293A establishes a Local Area Network (LAN) 285A for one or more nodes 292A, 292B, 292C communicatively interfaced thereto; and further in which the system 201 communicates with and controls a node 292A within the LAN 285A. In such an embodiment, the system 201 establishes access to the first WAN backhaul connection 298A through its communication and control with the node 292A within the LAN 285A.

Figure 2C:
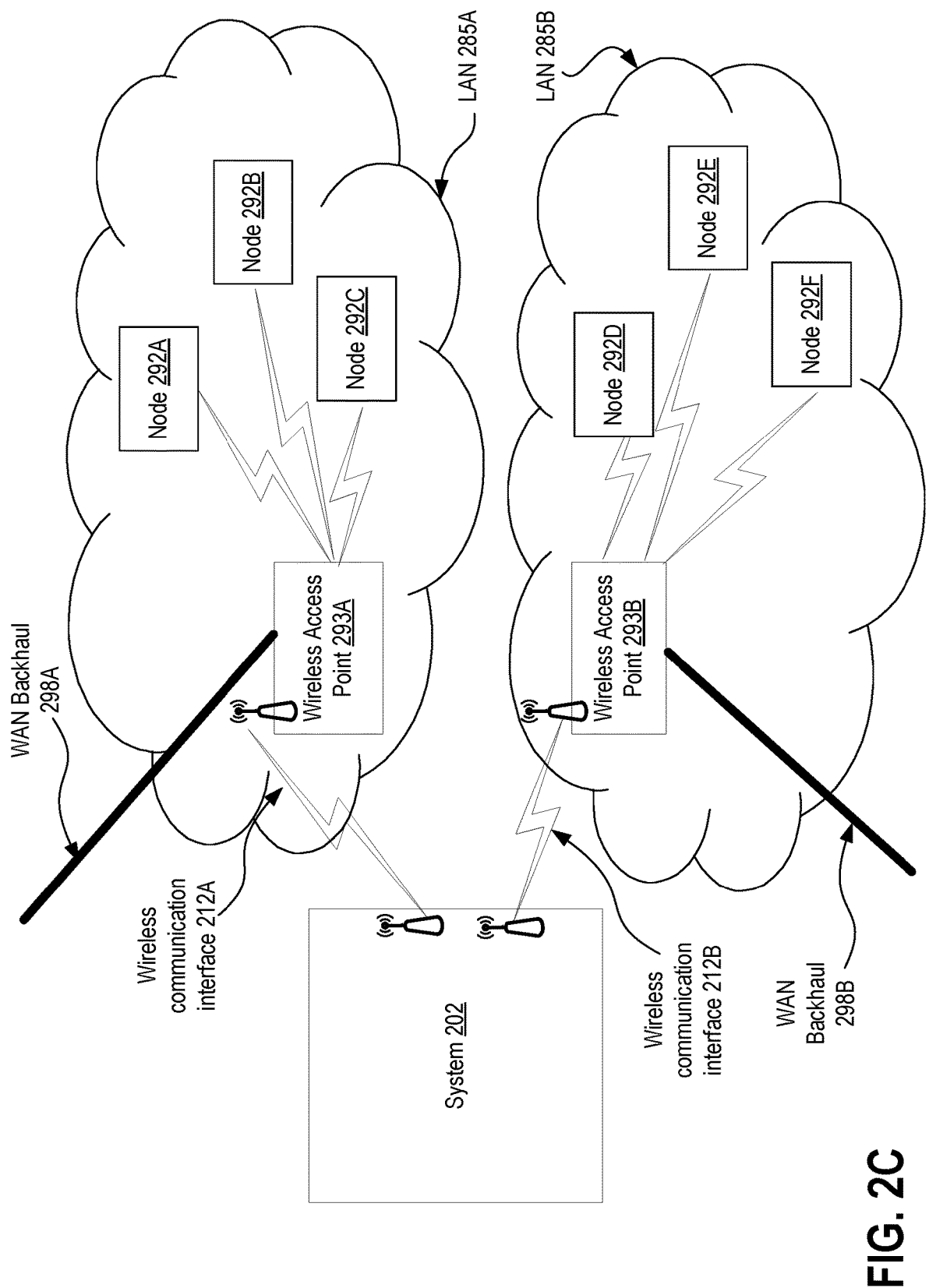
FIG. 2C shows an alternative diagrammatic representation of a system in which embodiments may operate, be installed, integrated, or configured.

FIG. 2C shows an alternative diagrammatic representation of a system 202 in which embodiments may operate, be installed, integrated, or configured.

According to another embodiment, the second wireless communications node (e.g., 299B at FIG. 2A) is embodied within a second wireless AP 293B, in which the second wireless AP 293B establishes a second LAN 285B, distinct from the first LAN 285A, for one or more nodes 292D, 292E, and 292F, communicatively interfaced thereto; and further in which the system 202 communicates with and controls a node 292D within the second LAN 285B while simultaneously communicating with and controlling the node 292A within the first LAN 285A. In such an embodiment, the system 202 establishes access to the second WAN backhaul connection 298B through its participation as a node (one of 292D-F) within the second LAN 285B.

According to one embodiment, the first wireless communications node (e.g., 299A of FIG. 2A or 293A of FIG. 2C) is embodied within a wireless station operating as a peer node within a Local Area Network (LAN) 285A, in which the peer node has access to the first WAN backhaul connection 298A via the LAN 285A, and further in which the first wireless communications interface 121A is a peer-to-peer connection with the peer node. In such an embodiment, the system 202 establishes access to the first WAN backhaul connection 298A through the peer-to-peer connection with the peer node (e.g., wireless access point 293A operating as a node within LAN 285A).

According to one embodiment, functionality of the control module 260 for the system 200 is distributed across one or more physical devices selected from the list including: a remote server; the first wireless communications device (e.g., 299A of FIG. 2A or 293A of FIG. 2C); the second wireless communications device (e.g., elements 299B or 293B); the first wireless communications node 292A; the second wireless communications node 292B; a router; a switch; and a broadband aggregation device.

According to one embodiment, each of the first wireless communications node 292A and the second wireless communications node 292B are selected from the group of devices including: a third generation (3G) compatible device; a fourth generation (4G) compatible device; a Long Term Evolution (LTE) compatible device; an access point; a modem; a router; a gateway; a Digital Subscriber Line (DSL) Customer Premises Equipment (CPE) modem; an in-home power line device; a Home Phoneline Network Alliance (HPNA) based device; an in-home coax distribution device; a G.hn compatible device; an in-home metering communication device; an in-home appliance communicatively interfaced with the LAN; a wireless femtocell base station; a wireless compatible base station; a wireless mobile device repeater; a wireless mobile device base station; an Ethernet gateway; a computing device connected to the LAN; a HomePlug device; an IEEE P1901 standards compatible access Broadband over Power Line (BPL) device; an Ethernet connected computer peripheral device; an Ethernet connected router; an Ethernet connected wireless bridge; an Ethernet connected network bridge; and an Ethernet connected network switch.

Figure 2D:
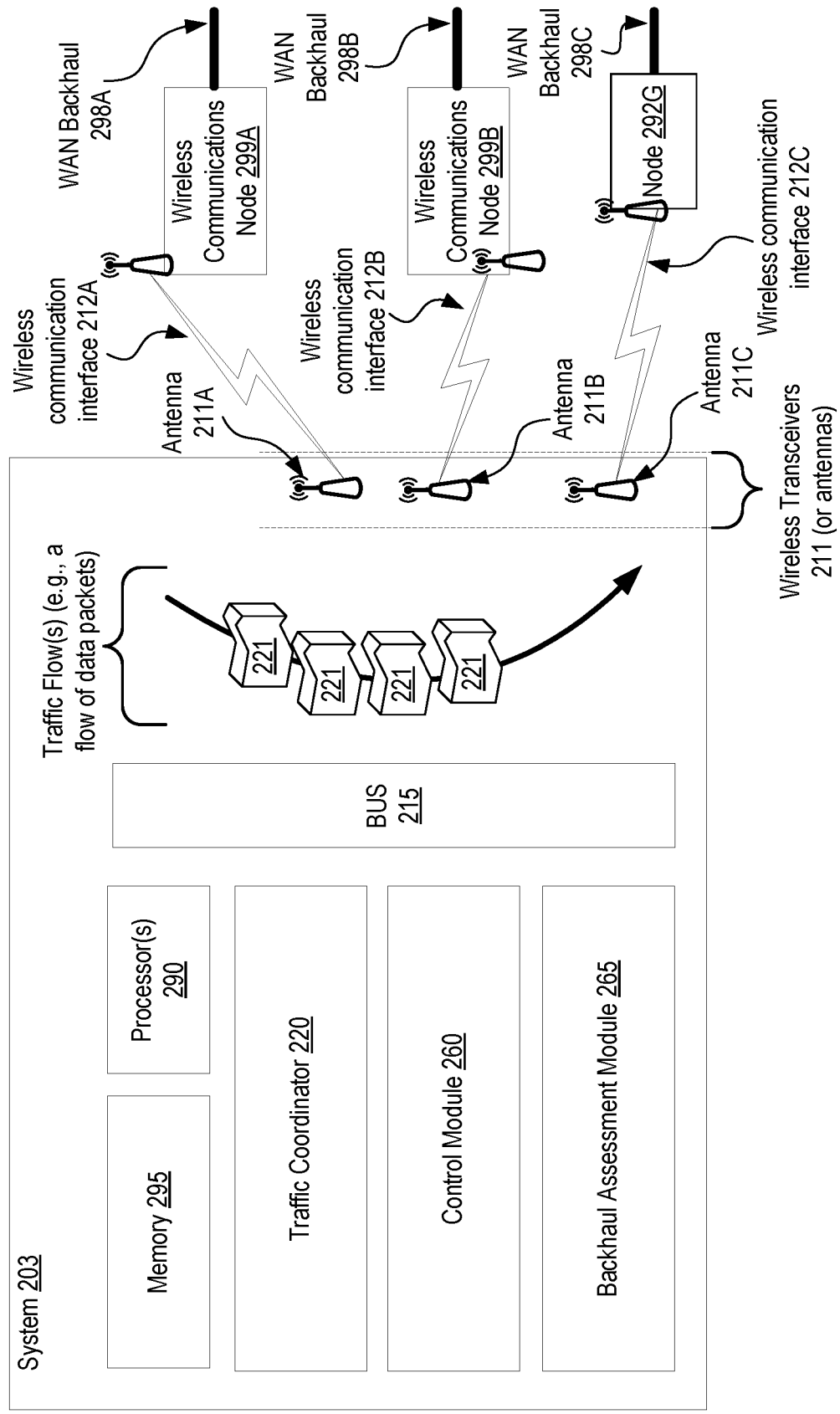
FIG. 2D shows an alternative diagrammatic representation of a system in which embodiments may operate, be installed, integrated, or configured.

FIG. 2D shows an alternative diagrammatic representation of a system 203 in which embodiments may operate, be installed, integrated, or configured.

According to one embodiment, such a system 203 further includes a third wireless communications interface 212C to a third wireless communications node 292G, in which the third wireless communications node 292G has access to a third WAN backhaul connection 298C distinct from the first and the second WAN backhaul connections 298A-B.

According to one embodiment, the system 203 further includes a backhaul assessment module 265. In one embodiment, the backhaul assessment module 265 is operable to perform the following operations: (a) measure performance of connectivity through the first, second, and third wireless communications interfaces (212A, 212B, and 212C) to the respective first, second, and third WAN backhaul connections (298A, 298B, and 298C), and further operable to (b) select two or more of the available WAN backhaul connections (212A, 212B, and 212C) to service the flow of data packets 221.

According to another embodiment, the backhaul assessment module 265 is operable to: (a) measure performance of connectivity through all available wireless communications interfaces 212A-C, and (b) further operable to select two or more of the available wireless communications interfaces 212A-C to service the flow of data packets 221 on the basis of: a WAN backhaul connection type preference associated with the assessed wireless communications interfaces (e.g., certain connection types may be specified as preferable over others, such as WiFi preferable over LTE, 3G, 4G, etc. regardless of speed, congestion, etc.); further operable to select two or more of the available wireless communications interfaces 212A-C on the basis of a number of node hops between the system and the servicing WAN backhaul connection (e.g., indirect connections may be less preferred, etc.); further operable to select two or more of the available wireless communications interfaces 212A-C on the basis of an assessed signal strength of the assessed wireless communications interfaces 212A-C; further operable to select on the basis of assessed traffic congestion at the assessed wireless communications interfaces 212A-C, at the corresponding WAN backhaul interface 298A-C, or both; and further operable to select on the basis of assessed available capacity at the assessed wireless communications interface 212A-C, at the corresponding WAN backhaul interface 298A-C, or both.

According to another embodiment, the system 203 includes means to communicate with and control the WAN backhaul (any of 298A-C) from the system 203. For instance, a DSM system, DSL management system, management device, etc., may be utilized in conjunction with the wireless control system so as to control and manipulate the WAN backhaul connection in the same manner that the wireless or WiFi connections are controlled and manipulated, thus providing even further overall signal and connectivity enhancements.

FIG. 3A is a flow diagram illustrating a method 300 for implementing and using optimized control systems for aggregation of multiple broadband connections over radio interfaces in accordance with described embodiments. Method 300 may be performed by processing logic that may include hardware (e.g., circuitry, dedicated logic, programmable logic, microcode, etc.), software (e.g., instructions run on a processing device to perform various operations such as interfacing, managing, receiving, controlling, analyzing, collecting, generating, monitoring, diagnosing, or some combination thereof). In one embodiment, method 300 is performed or coordinated via an apparatus such as that depicted at element 170 of FIG. 1 or the system 200 at FIG. 2A (e.g., a B.A.C.K. system) and described throughout. Some of the blocks and/or operations listed below are optional in accordance with certain embodiments. The numbering of the blocks presented is for the sake of clarity and is not intended to prescribe an order of operations in which the various blocks must occur.

Method 300 begins with processing logic for establishing a first wireless communications interface to a first wireless communications node, in which the first wireless communications node has access to a first Wide Area Network (WAN) backhaul connection (block 305).

At block 310, processing logic establishes a second wireless communications interface to a second wireless communications node, in which the second wireless communications node has access to a second WAN backhaul connection distinct from the first WAN backhaul connection.

At block 315, processing logic manages a flow of data packets such that a first sub-set of the flow is transmitted through the first WAN backhaul connection and a second sub-set of the flow is transmitted through the second WAN backhaul connection.

At block 320, processing logic collects and analyzes information on traffic and a radio environment from a plurality of network elements or management systems. For example, the network elements or management systems may be any of the nodes, wireless communication nodes, peer-nodes, routers, etc., as described above.

At block 325, processing logic controls the establishment and continuation of connections of the first and second wireless communications interfaces to WAN connections and WAN backhaul connections based on the collected information and analyses.

According to another embodiment of the preceding method 300, commands are issued to provide scheduling and routing instructions for the WAN connections and the WAN backhaul connections.

In yet another embodiment of the method, there are further operations including: optimizing the flow of data packets through the first and second respective WAN backhaul connections according to a scheduling algorithm, a load balancing algorithm, or both.

For instance, multiple nodes or stations (STAs) may each be provided with a utility function chosen either by a WiFi provider or by a consumer. Multiple Access Points (APs) further may each be provided with a backhaul capacity that may vary by backhaul provider.

According to one embodiment, an algorithm will vary the fraction of time STA k spends connecting to AP i over a short timescale. This is the scheduling decision. In one embodiment, the fractions must sum up across all APs to be less than 1 for each STA. There is a link capacity from each STA to each AP. These link capacities must be collectively feasible. The throughput from each STA to an AP is the product of a scheduling decision and the link capacity.

According to one embodiment, such a BACK system maximizes the sum of utility functions, one per STA as a function of the total throughput (e.g., the sum of per-AP link throughput for that STA). This optimization may be carried out under several constraints. In addition to the scheduling constraint and the link capacity constraint above, another constraint may be that the sum of the throughputs across all STAs connected to each AP cannot be bigger than the backhaul capacity of that AP.

Fairness can be controlled through the choice of utility functions for the STAs. For example, proportional fairness can be obtained by using logarithmic utility functions. Furthermore, weights can be installed in front of each utility function. These weights can be derived from either billing differences (e.g., some users pay more for greater weighted preference), or from multiple QoS classes, including in-building users, users passing by, users of various degrees of quality assurance, and so forth. These weights can also reflect the number of parallel TCP sessions for a given application flow.

Another issue considered by aspects of fairness control is the relationship between the rate that a STA would receive using a single AP and the rate it receives when using multiple APs. The ratio between these two rates may be controlled by a BACK system as described.

This problem can be solved in short timescales approximately (per timeslot), or over longer timescale for a target equilibrium. It can be solved in various ways, but use of extended information and control of a provider-supported control plane can dramatically enhance the efficiency of solving this problem. Furthermore, if the backhaul provider(s) participate in the optimization, then {B_i} becomes variables too.

Such a BACK system may directly relay these optimized vectors to each STA and AP, then the equipment assigns each transmission a path and timeslot such that the total traffic matches the optimal schedules and throughputs as close as possible.

Alternatively, the BACK system may indirectly assign link parameters and capacity to approximate the optimal solution. Different source/destination addresses, or different flows (i.e., video streams) may be assigned over different paths. Or a flow may be broken into multiple fragments, with a tracker file created by the BACK which determines the paths and slots that each data fragment is sent over.

In the special case of each STA being scheduled only to one AP at a time, solving this problem amounts to switching APs. In addition to solving the above problem formulation, we can further impose two additional elements to the solution method: Randomization and Hysteresis.

With randomization, each STA decides to switch from one AP to another with a certain probability so that the chance of simultaneous switching is smaller.

With hysteresis, switching from a STA scheduled to AP1 to the STA scheduled to AP2 means that the chance of switching back to AP1 within a few timeslots is lower, so as to avoid noise-induced flip-flop or a thrashing condition among APs.

According to another embodiment, the method further includes operations for issuing optimization instructions to the first wireless communications node or the second wireless communications node, or both, to implement configuration parameters in fulfillment of a determined scheduling and load balancing strategy.

According to another embodiment, the optimization instructions are based, at least in part, on one or more performance metrics retrieved from the first wireless communications node or the second wireless communications node, or both.

According to another embodiment, issuing the optimization instructions includes iteratively issuing the optimization instructions to improve measured performance, in which each of a plurality of iterations includes at least: (a) retrieving one or more performance metrics from the first wireless communications node or the second wireless communications node, or both; (b) evaluating the retrieved performance metrics; (c) determining updated configuration parameters in fulfillment of an updated scheduling and load balancing strategy; and (d) issuing updated optimization instructions to the first wireless communications node or the second wireless communications node, or both, to implement the updated configuration parameters.

According to a related embodiment, each of the plurality of iterations further includes an assessment of historic traffic data.

In one embodiment, issuing the optimization instructions includes an assessment based on one or more of: available performance tuning parameters; available historic traffic data; available historic radio link performance data within a geographic location-aware map; available performance and triangulation data within the geographic location-aware map; available selective Quality of System (QoS) parameters; available information on the underlying wireless network topology; available information on interference in the wireless network; bias toward one or more reliability targets; and available rewards and incentives for devices that participate in an aggregated WAN backhaul connection.

According to another embodiment, issuing the optimization instructions includes allocating increased bandwidth for the flow of data packets within an aggregated WAN backhaul connection based on a user allowing a wireless communications interface to wireless communications node having access to a WAN backhaul connection.

In accordance with one embodiment, there is a non-transitory computer readable storage medium having instructions stored thereon that, when executed by a processor of an apparatus, system, BACK device, or other compatible embodiment of the operations described herein, the instructions cause the apparatus to perform operations including: establishing a first wireless communications interface to a first wireless communications node, the first wireless communications node having access to a first Wide Area Network (WAN) backhaul connection; establishing a second wireless communications interface to a second wireless communications node, the second wireless communications node having access to a second WAN backhaul connection distinct from the first WAN backhaul connection; managing a flow of data packets such that a first sub-set of the flow is transmitted through the first WAN backhaul connection and a second sub-set of the flow is transmitted through the second WAN backhaul connection; collecting and analyzing information on traffic and a radio environment from a plurality of network elements or management systems; and controlling the establishment and continuation of connections of the first and second wireless communications interfaces to WAN connections and WAN backhaul connections based on the collected information and analyses.

Figure 3B:
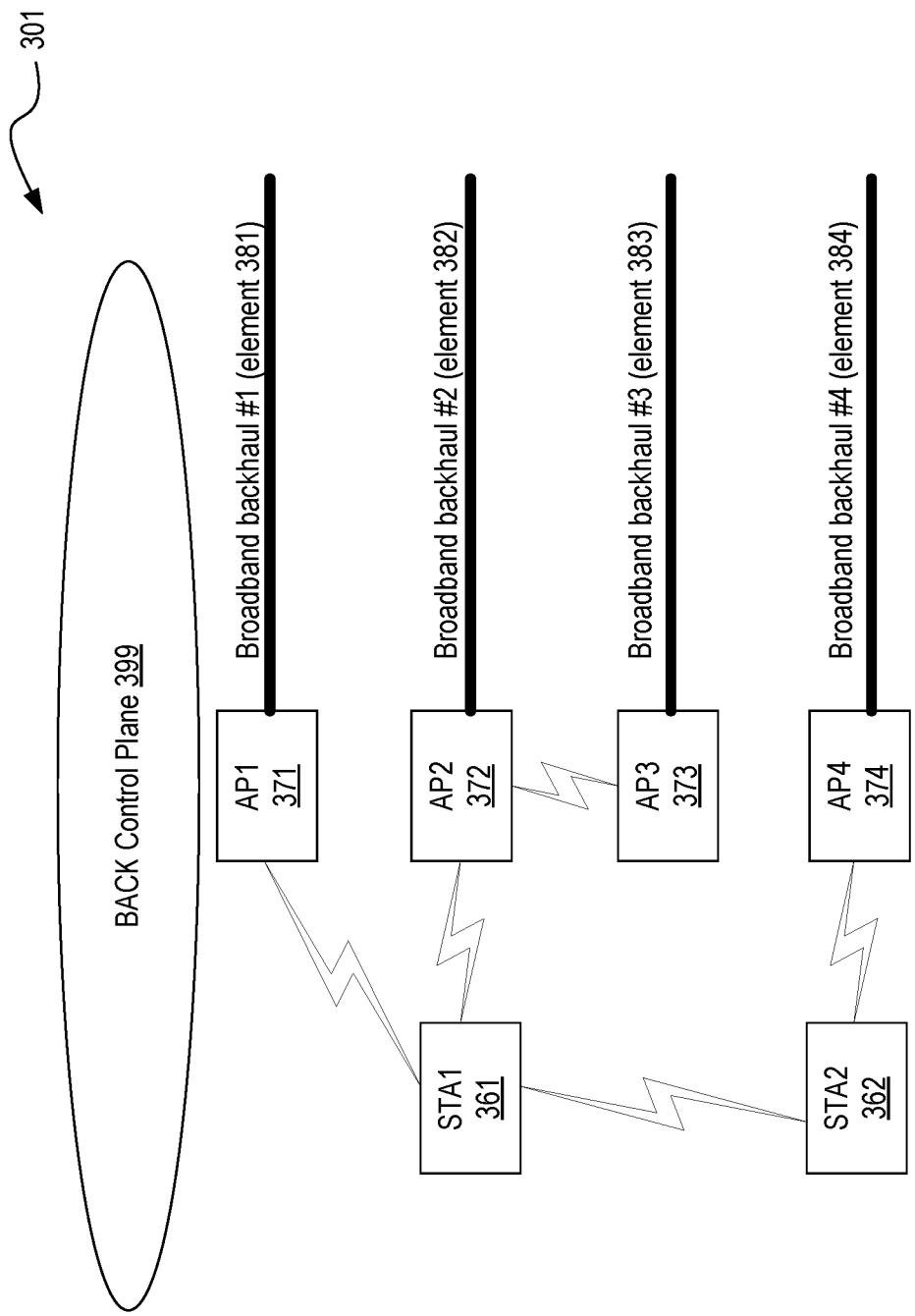
FIG. 3B shows an alternative diagrammatic representation of a BACK control plane in accordance with which embodiments may operate.
Figure 3C:
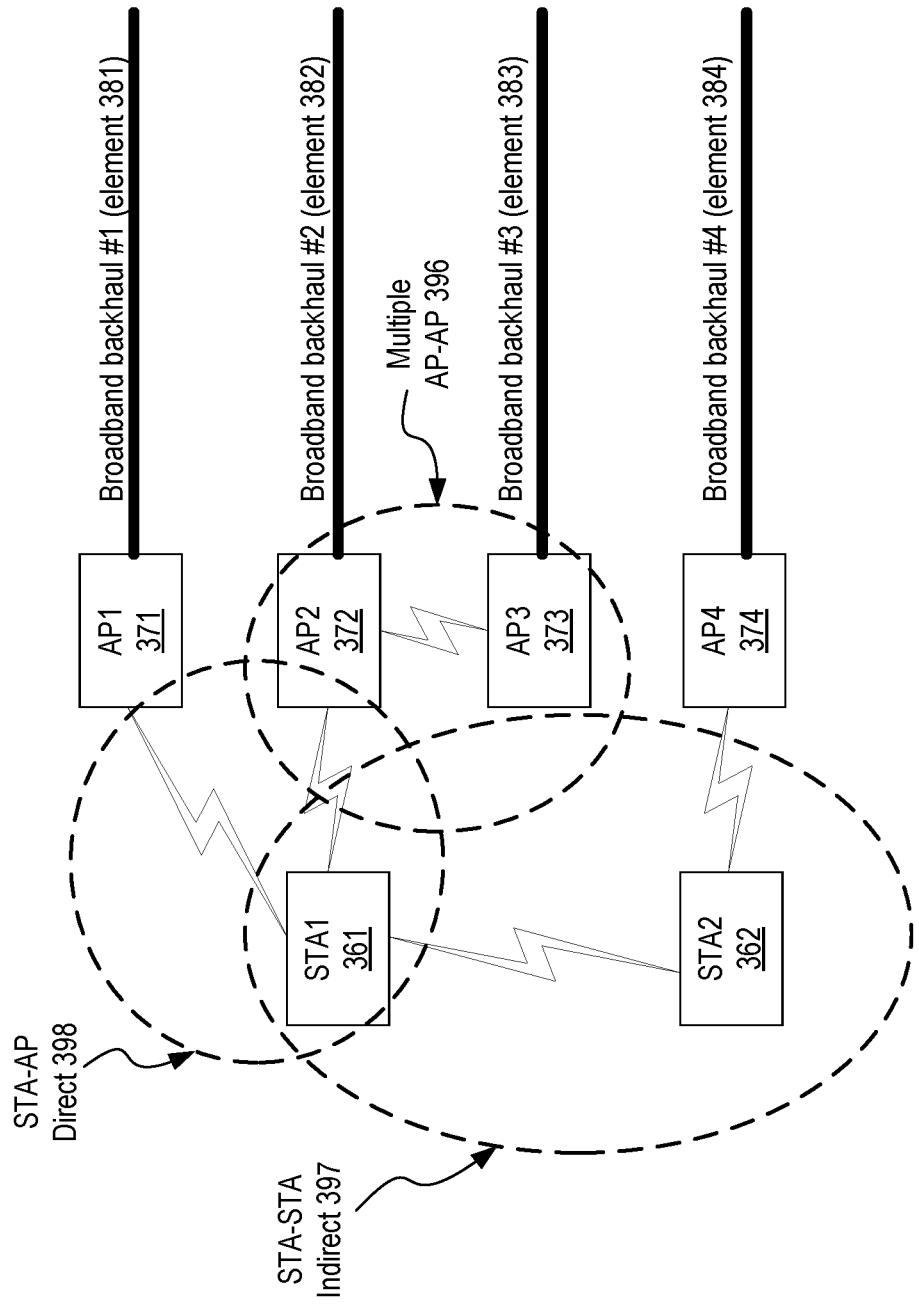
FIG. 3C shows an alternative diagrammatic representation of wireless communications interfaces in accordance with which embodiments may operate.

FIG. 3B shows an alternative diagrammatic representation of a BACK control plane 399 (e.g., a system, a BACK device, or a BACK system, etc.) in accordance with which embodiments may operate. While an exemplary physical architecture is depicted, there may be many more APs and STAs than are set forth by this example.

According to one embodiment, such a BACK system or BACK control plane 399 implements the methodologies set for above. For instance, such a system controls a multitude of IEEE 802.11 devices connected over multiple broadband backhaul connections, including Stations (STAs) such as smart phones, tablets, laptops, desktops, game consoles, and Internet TV sets that transmit and receive in the ISM bands, and Access Points (APs) that have air-interface connections with STAs on the one side and backhaul connection on the other to Ethernet, DSL, fiber, cable, or any other means of connecting to the rest of the Internet. The STAs and APs may communicate with advanced WiFi technologies, such as Super WiFi and multi-user MIMO.

According to one embodiment, each STA can connect to multiple APs and the associated broadband backhaul links. There are four modes of operation as defined by the following matrix, with acronyms indicated below in Table 1 depicting the applicable connection types:

TABLE 1

|  | Time-multiplexed connections to multiple APs | Simultaneous connections to multiple APs |
|---|---|---|
| Direct connection from each STA to multiple APs | D-TM | D-S |
| Indirect connection, where each STA connect to other STAs and then their APs | I-TM | I-S |

In I-TM and I-S modes, multihop radio connections among STAs are required, for example, via ad hoc mode in 802.11 or with dual radios. The methodologies also allow the APs to form a multihop network among themselves, so that bottlenecks of some backhaul capacity can be routed around through a longer path of APs. For example, 2.4 GHz links can be backhauled over a 40 MHz channel at 5 GHz.

In D-TM and I-TM modes, each STA at any given time only connects to a single AP, but switches among multiple APs over time according to a scheduling vector S(t) that depends on time t, e.g., S(100)=[1 0] and S(101)=[0 1].

In D-S and I-S modes, each STA connects to multiple APs at the same time, with traffic spread over them according to a load balancing vector S(t) that may depend on time t, e.g., S(100)=[0.8 0.2] and S(101)=[0.5 0.5]. Note that in TM modes, S is a binary vector, whereas in S modes, S is a real vector.

Which mode is in operation depends in part on the type of radio and connection management available in a given system. Some of the described methods apply to all modes, while others may be targeted specifically for certain modes.

According to the depicted architecture 301 having the BACK control plane 399 therein, there are provided four distinct broadback backhaul connections 1-4, set forth as elements 381, 382, 383, and 384 respectively. Each is connect with a corresponding access point, in which the broadband backhaul #1 connection 381 connects with AP1 at element 371, the broadband backhaul #2 connection 382 connects with AP2 at element 372, the broadband backhaul #3 connection 383 connects with AP3 at element 373, and in which the broadband backhaul #4 connection 384 connects with AP4 at element 374. There are two stations depicted as STA1 at element 361 and STA2 at element 362. Wireless interface connections are depicted between the various access points and stations, in which AP1 371 connects with STA1 361; AP2 372 connects with both STA1 361 and also AP3 373, AP3 373 being connected only with AP2 372 (and broadband backhaul #3 at element 383); AP4 374 being connected with only STA2 362 (and broadband backhaul #4 at element 384); and finally STA2 being connected with both STA1 361 and AP4 374.

Such Multi-AP architectures are indeed feasible. Control overhead is tolerable, managing packet transition and hand-off is possible, interaction with upper layer protocols such as TCP can be carried out, and security can be maintained as well, thus enabling multi-homed broadband access. Unfortunately, no conventional system has addressed the automated management and control functions which are necessary for high performance of a large scale system.

A control plane which is embodied by the Broadband AP Control Keeper (BACK) inputs measurements of the radio and backhaul environment, the capacity of each virtual link, and the load of each STA. The BACK system then determines optimal control parameter settings using algorithms, thus providing optimization of the long-term architectural set-up as well as real-time performance.

According to certain embodiments, BACK system controls include: Link settings, such as the selection of WiFi channels used by APs. Channel selection is done to avoid interference from APs that are under the control of the BACK as well as APs outside of BACK control. The goal is to use channels with the least interference, where interference is determined by received signal levels as well as by the traffic levels on the channel. Channel selection is implemented by the BACK system which assigns multiple channels and determines their traffic loads; both of which affect interference.

According to certain embodiments, BACK system controls further include connection control. For example, each STA can connect to several backhaul paths directly or indirectly, using time-multiplexed connections or simultaneous connections. Connection durations of only tens of milliseconds are practical, and so the BACK can assign scheduling vectors, S(t), to have many short duration timeslots to many APs and STAs, which are chosen to avoid interference. Or static connections may be assigned with simple load-balancing vectors S(t), or with simple main and back-up paths, or with S(t) only slowly varying such as with time-of-day.

According to certain embodiments, BACK system controls further include control of real-time traffic. Each radio connection to a backhaul link can be thought of as a virtual interface. Different IP addresses, flows, or even individual packets are routed over different interfaces via the optimal traffic assignments as determined by the BACK.

Each of the control areas affects the others. Since the individual problems do not decouple, they may be optimized collectively by the BACK system.

According to one embodiment, optimizing considers the following goals: (a) Multi-homed load balancing in which efficiency of the entire system, end to end, including the air interface and the broadband backhaul; (b) individual performance maximization in which efficiency of each individual STA and the Pareto optimal tradeoff among them; and (c) fairness of backhaul capacity allocation, of air interface capacity allocation, and of QoS for different classes of users.

Design bottlenecks of prior unsatisfactory solutions are overcome. For instance, there are provided: (a) incentive mechanisms, such as "tit for tat;" (b) stability of alternative path selection and reliability of end-to-end paths; (c) minimization of message passing required among STAs and APs and the time to switch the wireless communication paths; (d) measurement of backhaul capacity; (e) measurement of air-interface capacity in a time-varying environment; and (f) measurement of radio loss to and from different STAs and APs over different locations, in which such measurement can leverage STA location data from GPS or triangulation.

A transparent and optimized control plane is provided as an effective means to address the above issues, through, for example, (a) exploitation of past long-term traffic patterns, which often form a repetitive and predictable pattern and can be used for a posteriori estimation of future traffic; (b) exploitation of ISP measurement, including those gathered at the backhaul such as broadband traffic, capacity, and neighborhood location information; (c) exploitation of joint backhaul capacity and multi-AP schedule design; (d) exploitation of backhaul control points, such as RT in certain DSL backhaul systems, to become a BACK, as an anchor of control plane decisions; and (e) exploitation of location information, geographic maps, and the radio environment including radio loss to different locations.

The BACK control plane 399 can also connect to a LTE and/or WiFi gateway to report the condition of LTE network and enable dynamic choice between LTE and WiFi connections. This is particularly likely a scenario as cellular wireless networks continue the trend of reducing cell sizes. The control system, when connected to LTE/WiFi gateway, can also select the best backhaul link, with the least congestion and most available capacity, for the mix of LTE and WiFi air-interface traffic to be routed to.

With Station-to-Station, peer-to-peer architectures, indirect architectures are formed by the STAs resulting in a multihop air-interface STA-STA network. We refer to this as peering relationships. The formation of peering relationships is based on the following factors: (a) performance in which some STAs have higher speed connectivity to APs that also have higher backhaul speed, so called "strong STAs" with the opposite being "weak STAs," and in which strong STAs can become peers that help weak STAs; (b) economic in which STAs participating in this architectures as helping peers are rewarded either through monthly bill credits or "tit for tat" strategies; and (c) security in which only those STAs with high level of security, e.g., strong encryption on messages can use other STAs as relay peers, and only those STAs with trusted users can act as relay peers.

There are various ways to optimize peering relationships. However, in order to minimize the overhead, two specific methods are specifically proposed: reservation and preconfiguration.

Utilizing reservation of a specific peering STA as a one-hop relay which significantly reduces overhead, instability, and packet transition mechanics associated with dynamically searching for STAs in real time. More generally, considering that some STAs may be powered off in multi-tenant buildings, each STA has a ranked order list of STAs in descending order of choice as peering STA, with a default length of, for example "3." It goes down the list from the first STA on the list, and when that is not available, goes to the second, etc.

Utilizing preconfiguration of fixed peering path is done offline based on performance measurement over a long timescale, e.g., weeks and months, and can be updated e.g. every month, or when a peering STA is powered off continuously for e.g. one week.

For multi-AP access control, control optimization formulation and solution are proposed. First we introduce our formulation of the problem using the following notation:

Each STA is indexed by k, with a utility function $U\_k$ chosen either by WiFi provider or by consumer;

Each AP is indexed by i, with a backhaul capacity $B\_i$ that can be varied by backhaul provider;

$S\_{ki}$: the fraction of time STA k spends connecting to AP i over a short timescale. They must sum up across i to be less than 1 for each k for each radio interface;

$C\_i$: the capacity region for STAs associated with AP i, which is a function of all the $S\_{ki}$;

$C\_{ki}$: the link capacity from STA k to AP i. The set of $C\_{ki}$ across all k must lie within the capacity region $C\_i$. The exact tradeoff can be complicated, depending on many factors in PHY and MAC layers, as well as topologies like the existence of hidden nodes;

$X\_{ki}$: throughput from STA k to AP i. It is the product of $S\_{ki}$ and $C\_{ki}$;

The direct optimization variables are $S\_{ki}$, the scheduling/load balancing factors per STA and AP pair. Many of these may be 0. $S\_{ki}$ in turn drive $C\_{ki}$, which is also influenced by other factors like channel assignment across APs. They collectively determine $X\_{ki}$;

Then $X\_{ki}$ summed across all k for a given i must be smaller than backhaul capacity $B\_i$ for AP I; and $X\_{ki}$ summed across all i for a given k is the input to the utility function for STA k.

TABLE 2

| Maximize subject to | sum_k U_k (y_k), | All k, |
|---|---|---|
| | sum_i X_ki = y_k, | All i, |
| | sum_k X_ki <= B_i, | All (k,i) |
| | X_ki = S_ki * C_ki, | All i, and |
| | sum_i S_ki <= 1, and | All i |
| | {C_ki}_k in Capacity region C_i({S_ki}_k), | |

This problem can be solved in various ways, but it can be seen that the extended information and control of a provider-supported control plane can dramatically enhance the efficiency of solving this problem.

This problem can be solved in short timescale approximately (per timeslot), or over longer timescale for a target equilibrium. If backhaul provider(s) participate in the optimization, then {B_i} become variables too. If TM mode is used rather than S mode, $S\_{ki}$ needs to be integers. Solving this problem amounts to switching APs. In addition to solving the above problem formulation, we can further impose two additional elements to the algorithm:

Solving the above optimization provides a way to choose $S\_{ki}$, or equivalently, $S\_k$ vectors, one for each STA k. This is a short timescale optimization.

In the longer timescale optimization, we can also enforce a constraint that the sum of $y\_k(t)$ over a window of timeslots {t} is sufficiently big, since slower links take longer to complete a job.

Fairness can be controlled through the choice of utility functions $U\_k$. For example, proportional fairness across $y\_k$ can be obtained by using logarithmic utility functions: $U\_k = \log(y\_k)$. In general, alpha-fair utility functions can be used [12], with larger alpha leading to more fair allocations.

Furthermore, weights can be installed in front of each utility function. For example, $U\_k = w\_k * \log(y\_k)$, where weights {$w\_k$} reflect the relative importance of STA k. This can be derived from either billing differences (some users pay more), or from multiple QoS classes, including in-building users, passer-by users, users of various degrees of quality assurance. These weights can also reflect the number of parallel TCP sessions for a given application flow, as will be further discussed in Section D below.

Another issue important for fairness control is the relationship between the rate that a STA would receive using a single AP and the rate it receives when using multiple APs. The ratio between these two rates needs to be reasonable. There are two ways to incorporate fairness here: (a) instead of looking at the utility function of $y\_k$, we use utility function of this ratio, (b) use a generalized alpha-fair utility function [12] where each STA has a preference parameter $q\_k$, and this parameter is the normal rate STA k receives without using multiple APs.

This procedure optimizes $X\_{ki}$, the throughput from STA k to AP i; and $S\_{ki}$, the scheduling/load balancing factors. The BACK may directly relay these optimized vectors to each STA and AP, then the equipment assigns each transmission a path and timeslot such that the total traffic matches $X\_{ki}$ and $S\_{ki}$ as close as possible.

Or, the BACK control plane 399 may indirectly assign link parameters and capacity to approximate the optimal solution. Different source/destination addresses, or different flows (i.e., video streams) may be assigned over different paths. Or a flow may be broken into multiple fragments, with a tracker file created by the BACK which determines the paths and slots that each data fragment is sent over.

Measurement from STAs is a difficult issue in multi-AP architectures, under practical constraints on the accuracy and granularity of measurements from the STAs. Thus, methods are proposed that use a service providers capability to run a control plane using a BACK system to collect data more effectively.

Measurement of backhaul capacity values {$B\_i$} can be carried out through backhaul ISP's data and speed tests. This enables connecting to the optimal APs depending on time-of-day, a long timescale optimization of S(t).

Measurement of air interface capacity regions {$C\_i$} is made more difficult because it involves time varying air interface conditions, and in general the capacity regions are coupled when the APs are close enough together. The BACK collects data, such as the throughput vectors for the STAs connected to each AP under different loading conditions, to help estimate the capacity regions more accurately. Air interface capacity is measured on each link, to each STA. A large database is populated, including counts of connection speeds, passive counts of existing traffic throughput, and active probing tests measuring delay and throughput.

In both types of measurement above, the invention incorporates historical time-of-day data to lessen the need for instantaneous measurement. In certain deployment scenarios such as multi-tenant buildings, data shows that each weekday (other than Friday) exhibits remarkable repetitive patterns of usage over a 24-hour period, and each day of the week also exhibits such patterns across different weeks (except for holidays). Using data over a sliding time window, both {B_i} and {C_i} can be approximately predicted ahead of time during each hour of each day.

The optimization and measurement procedure may also be performed iteratively to successively decrease error or improve performance.

Joint design of wireless connections and wired backhaul are proposed such that air interface and backhaul are be jointly optimized with compatible devices. The opportunity can be seen by observing in the optimization problem above that {B_i} constrains the best {X_ki}, thus the best objective function value, achievable.

However, {B_i} cannot all be increased at the same time. For example, in DSL backhauls, dynamic spectrum management (DSM) methods change the tradeoff among the backhaul links by picking different points on the DSL capacity region's boundary. Under the joint design in this disclosure, those APs with a higher demand of STA traffic will be given higher priority in DSM, thus alleviating the bottleneck constraints on those APs. One way to readily tell which AP's capacity to increase is to look at the optimal Lagrange multipliers or the slackness corresponding to each of the B_i constraints in the optimization problem. Conversely, if some B_i cannot be readily increased further (due to hitting the capacity region's limit), the STA-AP peering relationship can be re-optimized to avoid passing traffic through that bottleneck.

A related and challenging issue is that of an incentive mechanism to open WiFi to use by others. Here methods are proposed to leverage "tit-for-tat" mechanisms. For instance, a unit of credit is provided as each STA or AP opens up to relay traffic over one period of time, e.g., 1 minute. Then over a moving window of e.g. 1 day, each STA and AP needs to have accumulated a minimum amount of credits, e.g. 10 units, in order to be in a position to participate in multi-AP sharing: asking other STAs and APs to help relay its traffic.

A scale can also be built, in which more credits lead to longer period of time with the "ticket" to participate in multi-AP sharing. In order to normalize across STAs and APs with different capacities, credits can also be given proportional to the percentage of relay traffic vs. direct traffic.

The combination of methods described herein effectively lead to multiple "end-to-end" paths between each STA and the boundary of the access network, e.g., the Broadband Network Gateway (BNG). While the rest of the path through the Internet is decided by protocols such as IP and influenced by metro and backbone network conditions, the access network portion described above is often the performance bottleneck. Therefore, control of multi-homing capabilities within the access network is highly valuable for instituting optimizations and greater operational efficiency.

Multi-homing control is valuable in performance tuning, e.g., use of DSL backhaul traffic data to determine optimal routes. Multi-homing control is useful for QoS (and revenue base) differentiation, e.g., route different connections, traffic classes, or packets, over different paths. Across the access network, the system can also optimize TCP traffic flows using multiple TCP connections to increase overall bandwidth. This means that we will install fairness and maximize efficiency across three levels of granularity: per packet, per TCP connection, and per application flow. This can follow the policy set by a provider or policy manager.

Multi-homing control is also valuable in load balancing, e.g., dynamic assignment of multiple routes. Again, route and time-slot assignment can be based on historical traffic patterns at different time-of-day and day-of-week. And multi-homing control is valuable in reliability. The multi-AP architecture effectively enables multi-homing that provides alternative paths in time of severe congestion or equipment failure. In particular, node-disjoint paths can be picked out across WiFi air-interface and backhaul so that multiple sessions can share a given node-disjoint path for backup in time of failure.

Figure 4:
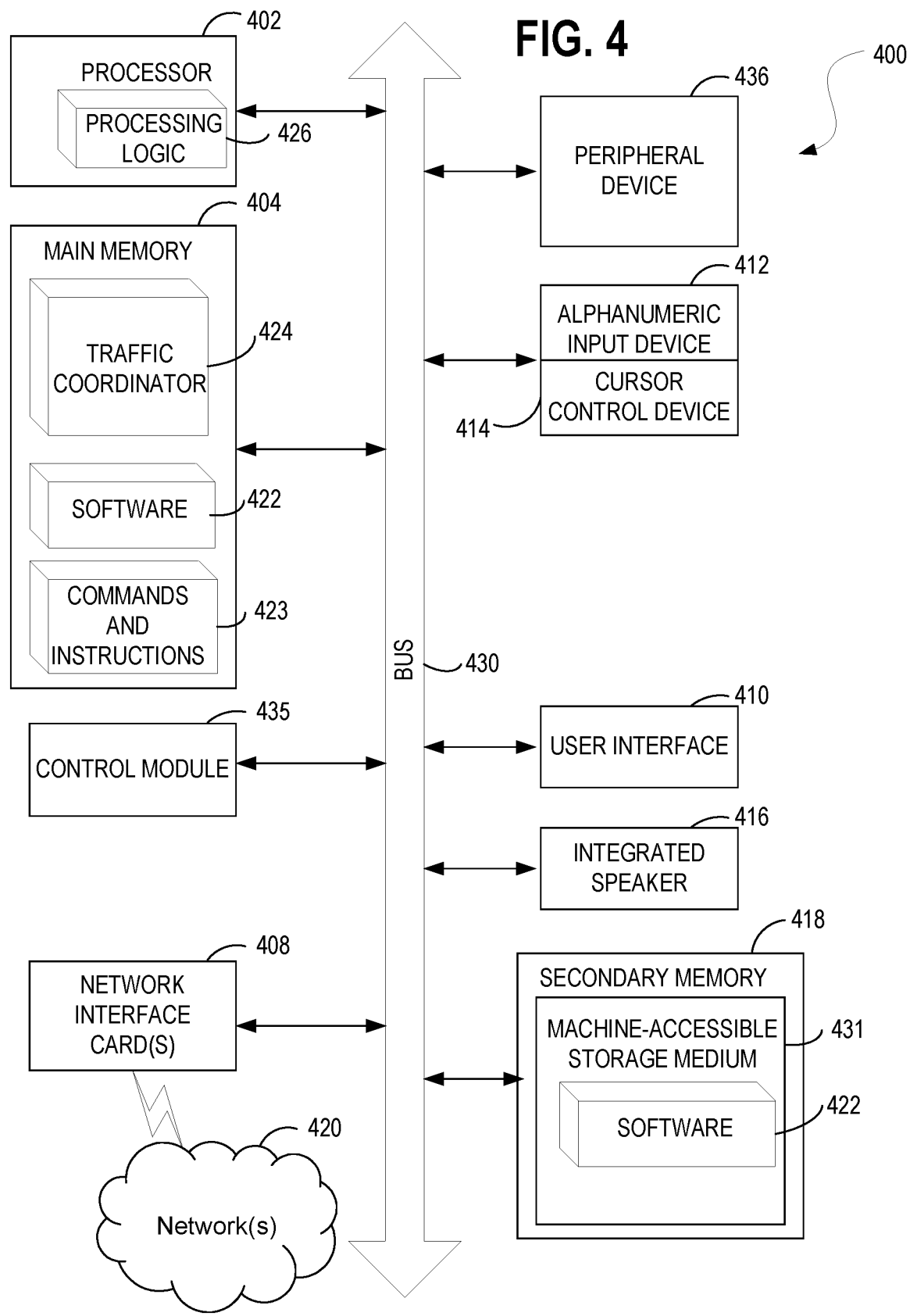
FIG. 4 illustrates a diagrammatic representation of a machine in the exemplary form of a computer system, in accordance with one embodiment.

FIG. 4 illustrates a diagrammatic representation of a machine 400 in the exemplary form of a computer system, in accordance with one embodiment, within which a set of instructions, for causing the machine/computer system 400 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 418, which communicate with each other via a bus 430. Main memory 404 includes a traffic coordinator 424 and also commands and instructions. Main memory 404 and its sub-elements (e.g. 423 and 424) are operable in conjunction with processing logic 426 and processor 402 to perform the methodologies discussed herein.

Control module 435 is further depicted operable in conjunction with software 422 as well as the traffic coordinator 424 and commands and instructions 423 as described previously.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and functionality which is discussed herein.

The computer system 400 may further include a network interface card 408. The computer system 400 also may include a user interface 410 (such as a video display unit, a liquid crystal display (LCD), or a cathode ray tube (CRT)), an alphanumeric input device 412 (e.g., a keyboard), a cursor control device 414 (e.g., a mouse), and a signal generation device 416 (e.g., an integrated speaker). The computer system 400 may further include peripheral device 436 (e.g., wireless or wired communication devices, memory devices, storage devices, audio processing devices, video processing devices, etc.).

The secondary memory 418 may include a non-transitory machine-readable or computer readable storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-readable storage media. The software 422 may further be transmitted or received over a network 420 via the network interface card 408.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A controller that interfaces with wireless communications nodes, the controller comprising:
   a first interface to couple to a first wireless communications node, the first wireless communications node having been established via a first wireless transceiver and having access to a first backhaul connection;
   a second interface coupled to a second wireless communications node, the second wireless communications node having been established via a second wireless transceiver and having access to a second backhaul connection; and
   a control module that issues instructions to perform multi-homed load balancing of data traffic through the first and second wireless communications nodes and their respective backhaul connections, the instructions control at least one of a channel assignment and a connection assignment among at least one of a network station and an access point (AP).

2. The controller of claim 1, wherein the first backhaul connection comprises a Wide Area Network (WAN) backhaul connection.

3. The controller of claim 1, wherein a functionality of the control module is performed by a wireless communications device that is coupled to the first wireless communications node.

4. The controller of claim 1, wherein a functionality of the control module is performed by a server that is coupled to the first wireless communications node.

5. The controller of claim 1, wherein the first wireless backhaul connection is a wireless connection.

6. The controller of claim 1, wherein the first wireless backhaul connection is one of a wired and a fiber optic backhaul connection.

7. The controller of claim 1, wherein the instructions increase a bandwidth through at least one of the first and second backhaul connections.

8. The controller of claim 1, wherein the control module evaluates a capacity adjustment for an AP to increase a joint backhaul capacity.

9. The controller of claim 1, wherein the control module performs a diagnostic on a broadband communications service.

10. The controller of claim 9, wherein the diagnostic comprises speed testing.

11. The controller of claim 1, wherein a communication between the first interface and the first wireless communications nodes is time-multiplexed.

12. The controller of claim 1, wherein a communication between the first interface and the first wireless communications nodes is frequency-multiplexed.

13. The controller of claim 1, wherein the first wireless communications interface is coupled to the first wireless communications node via a multi-hop air-interface network.

14. A method interfacing with wireless communications nodes, the method comprising:
    coupling a first interface to a first wireless communications node, the first wireless communications node having been established via a first wireless transceiver and having access to a first backhaul connection;
    coupling a second interface to a second wireless communications node, the second wireless communications node having been established via a second wireless transceiver and having access to a second backhaul connection; and
    using a control module to issue instructions to perform multi-homed load balancing of data traffic through the first and second wireless communications nodes and their backhaul connections, respectively, the instructions controlling at least one of a channel assignment and a connection assignment among at least one of a network station and an access point (AP).

15. The method of claim 14, comprising evaluating a capacity adjustment for an AP to increase a joint backhaul capacity.

16. The method of claim 14, comprising performing a diagnostic on a broadband communications service.

17. The method of claim 14, comprising determining a parameter associated with at least one of the first and second wireless communication nodes, the parameter comprising one or more of:
    a radio link connection setting;
    a broadband connection setting;
    a backhaul connection at the AP;
    an Internet Protocol (IP) address assignment for a flow of data packets;
    an IP address assignment for a first and a second sub-set of the flow of data packets;

a Quality of Service (QoS) classification for the flow of data packets;
an assessed signal strength; and
a frequency band.

18. The method of claim 14, wherein controlling at least one of a channel assignment and a connection assignment comprises determining an assessment that is based on one or more of:
a traffic flow;
a radio environment;
a performance tuning parameter;
historic traffic data;
historic radio link performance data within a geographic map;
performance and triangulation data within a geographic Quality of Service (QoS) parameter;
information on an underlying wireless network topology;
information on an interference in the wireless network;
a bias toward one or more reliability targets; and
rewards or incentives for devices that participate in an aggregated wide area network backhaul connection.

19. A system to interface with wireless communications nodes, the system comprising:
a traffic coordinator to interface to two or more wireless communications nodes;
a first wireless transceiver that establishes first wireless communications node and has access to a first backhaul connection;
a second wireless transceiver that establishes second wireless communications node and has access to a second backhaul connection;
first and second interfaces to couple to the first and second wireless communications nodes, respectively; and
a control module comprising a processor and a non-transitory computer-readable medium comprising instructions that, when executed by the processor, cause steps to be performed, the steps comprising:
issuing instructions to perform multi-homed load balancing of data traffic through the first and second wireless communications nodes and their respective backhaul connections, the instructions control at least one of a channel assignment and a connection assignment among at least one of a network station and an access point (AP).

20. The system of claim 19, wherein the control module determines a parameter associated with at least one of the first and second wireless communication nodes, the parameter comprising one or more of:
a radio link connection setting;
a broadband connection setting;
a backhaul connection at the AP;
an Internet Protocol (IP) address assignment for a flow of data packets;
an IP address assignment for a first and a second sub-set of the flow of data packets;
a Quality of Service (QoS) classification for the flow of data packets;
an assessed signal strength; and
a frequency band.

* * * * *